(12) United States Patent
Hagiwara

(10) Patent No.: US 11,206,334 B2
(45) Date of Patent: Dec. 21, 2021

(54) IMAGE FORMING APPARATUS HAVING PLURALITY OF CONVEYANCE MODES

(71) Applicant: CANON KABUSHIKI KAISHA, Tokyo (JP)

(72) Inventor: Hiroshi Hagiwara, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/920,938

(22) Filed: Jul. 6, 2020

(65) Prior Publication Data

US 2021/0021716 A1    Jan. 21, 2021

(30) Foreign Application Priority Data

Jul. 19, 2019    (JP) .............................. JP2019-134018

(51) Int. Cl.
*H04N 1/46* (2006.01)
*H04N 1/00* (2006.01)
*G03G 15/00* (2006.01)

(52) U.S. Cl.
CPC ......... *H04N 1/00082* (2013.01); *G03G 15/55* (2013.01); *H04N 1/00005* (2013.01); *H04N 1/0009* (2013.01); *H04N 1/00029* (2013.01); *H04N 1/00572* (2013.01)

(58) Field of Classification Search
None
See application file for complete search history.

(56) References Cited

U.S. PATENT DOCUMENTS

| 9,811,042 | B2 | 11/2017 | Nakamura et al. | |
|---|---|---|---|---|
| 2010/0028029 | A1* | 2/2010 | Yokoyama | G03G 15/0194 399/39 |
| 2014/0369702 | A1* | 12/2014 | Yokoyama | G03G 15/5062 399/15 |
| 2015/0243010 | A1* | 8/2015 | Kaneko | H04N 1/00037 382/112 |
| 2016/0255232 | A1* | 9/2016 | Ooishi | H04N 1/6094 358/2.1 |
| 2016/0279950 | A1 | 9/2016 | Sugaya et al. | |
| 2017/0068194 | A1* | 3/2017 | Mori | B65H 29/00 |
| 2017/0308021 | A1* | 10/2017 | Kato | B65H 85/00 |

(Continued)

FOREIGN PATENT DOCUMENTS

| JP | 2006-030564 A | 2/2006 |
|---|---|---|
| JP | 2015-001600 A | 1/2015 |

(Continued)

*Primary Examiner* — Dung D Tran
(74) *Attorney, Agent, or Firm* — Venable LLP

(57) ABSTRACT

An image forming apparatus includes an image formation unit configured to form an image on a sheet at a formation position; a circulatory conveyance path for conveying the sheet with the image formed at the formation position on a first side thereof to the formation position again; a reading unit configured to read the first side of the sheet conveyed through the circulatory conveyance path and output image information; and a conveyance control unit configured to convey the sheet in one conveyance mode out of a plurality of conveyance modes when the reading unit reads the first side of the sheet. A range, in a conveyance direction, of the sheet that can be read by the reading unit while a conveyance speed of the sheet is constant is different for each of the plurality of conveyance modes.

28 Claims, 15 Drawing Sheets

(56) References Cited

U.S. PATENT DOCUMENTS

| | | | | |
|---|---|---|---|---|
| 2017/0318172 A1* | 11/2017 | Matsuzaki | ......... | H04N 1/00045 |
| 2018/0108122 A1* | 4/2018 | Fukase | ................. | G06T 7/0008 |
| 2019/0033770 A1 | 1/2019 | Shiokawa et al. | | |
| 2019/0129342 A1* | 5/2019 | Ikeda | ................... | G03G 15/553 |
| 2020/0341422 A1* | 10/2020 | Harada | .............. | G03G 15/5062 |

FOREIGN PATENT DOCUMENTS

| | | |
|---|---|---|
| JP | 2016-048309 A | 4/2016 |
| JP | 2019-028329 A | 2/2019 |
| WO | 2014/208587 A1 | 12/2014 |

\* cited by examiner

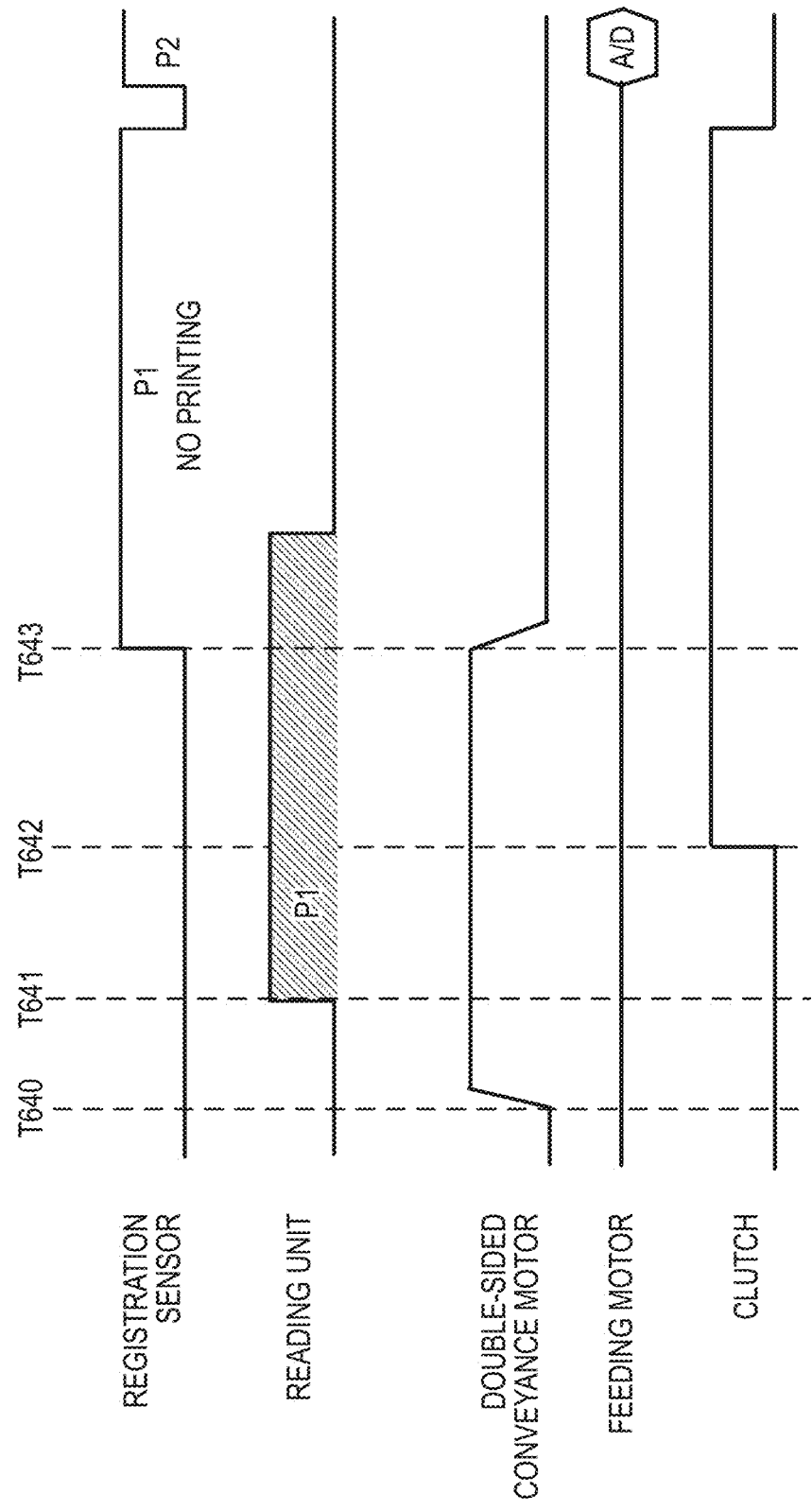

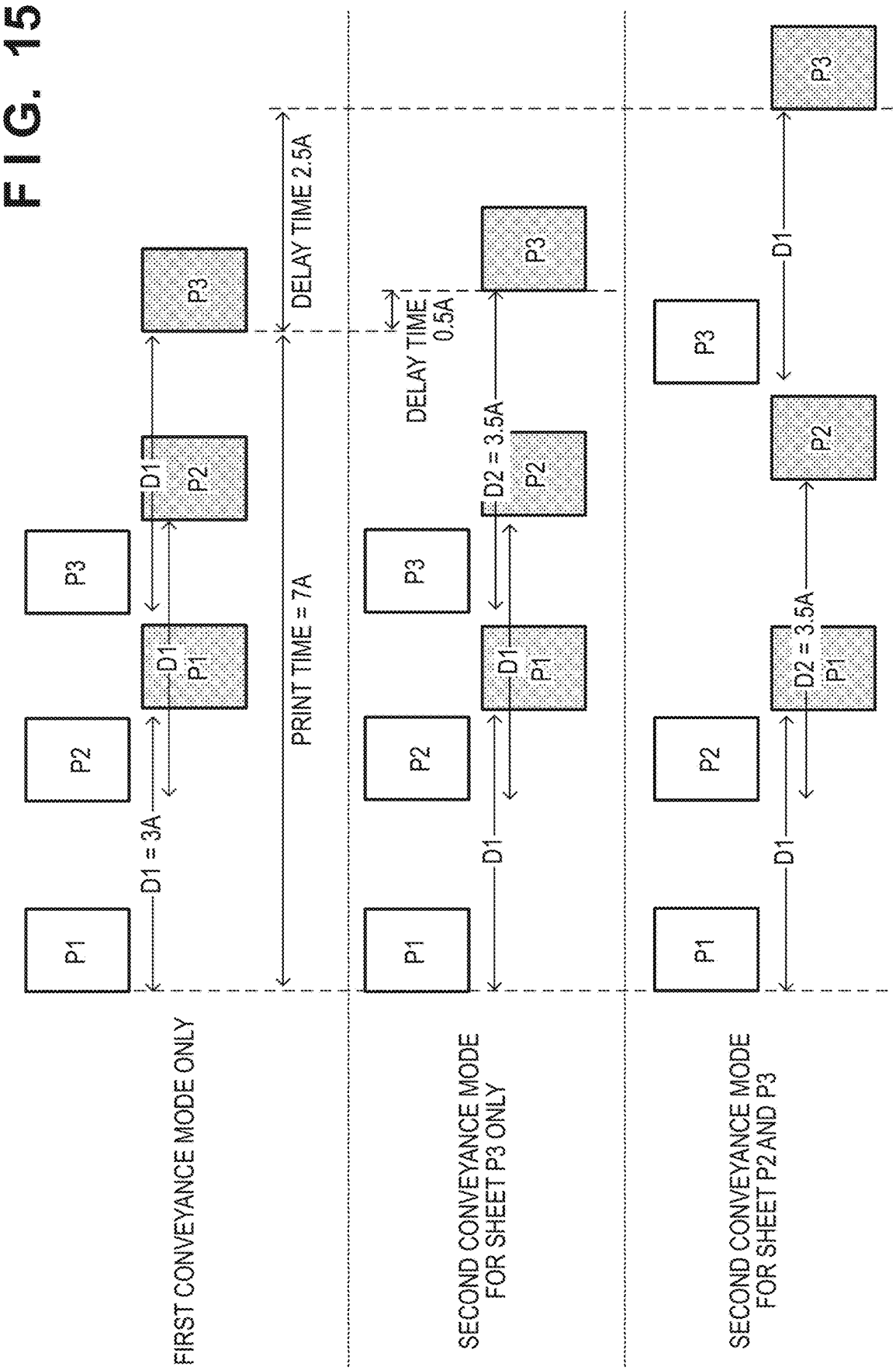

IMAGE FORMING APPARATUS HAVING PLURALITY OF CONVEYANCE MODES

BACKGROUND OF THE INVENTION

Field of the Invention

The present invention relates to an image forming apparatus provided with a reading unit that reads images.

Description of the Related Art

Image forming apparatuses that includes a reading unit provided with a CIS (Contact Image Sensor), and detect an image failure as a result of the reading unit reading a sheet subjected to image formation have been proposed. US-2014-369702 discloses a configuration in which, while a reading unit reads a sheet, the conveyance speed of the sheet is kept constant such that an image is read in a stable manner.

When consecutively forming images on a plurality of sheets, an image forming apparatus usually changes the conveyance speed for each of the sheets in order to improve the productivity. Accordingly, the productivity decreases if the conveyance speed of the sheets is kept constant to cause the reading unit to read the sheets.

SUMMARY OF THE INVENTION

According to an aspect of the present invention, an image forming apparatus includes: an image formation unit configured to form an image on a sheet at a formation position; a circulatory conveyance path for conveying the sheet with the image formed at the formation position on a first side thereof, to the formation position again; a reading unit configured to read the first side of the sheet conveyed through the circulatory conveyance path, and output image information on the first side of the sheet; and a conveyance control unit configured to convey the sheet in one conveyance mode out of a plurality of conveyance modes when the reading unit reads the first side of the sheet, wherein a range, in a conveyance direction, of the sheet that can be read by the reading unit while a conveyance speed of the sheet is constant is different for each of the plurality of conveyance modes.

Further features of the present invention will become apparent from the following description of exemplary embodiments with reference to the attached drawings.

BRIEF DESCRIPTION OF THE DRAWINGS

FIG. 9 is a timing chart of the third conveyance mode.

FIG. 15 is a diagram illustrating the productivities resulting from the processing in FIG. 13.

DESCRIPTION OF THE EMBODIMENTS

Figure 1:
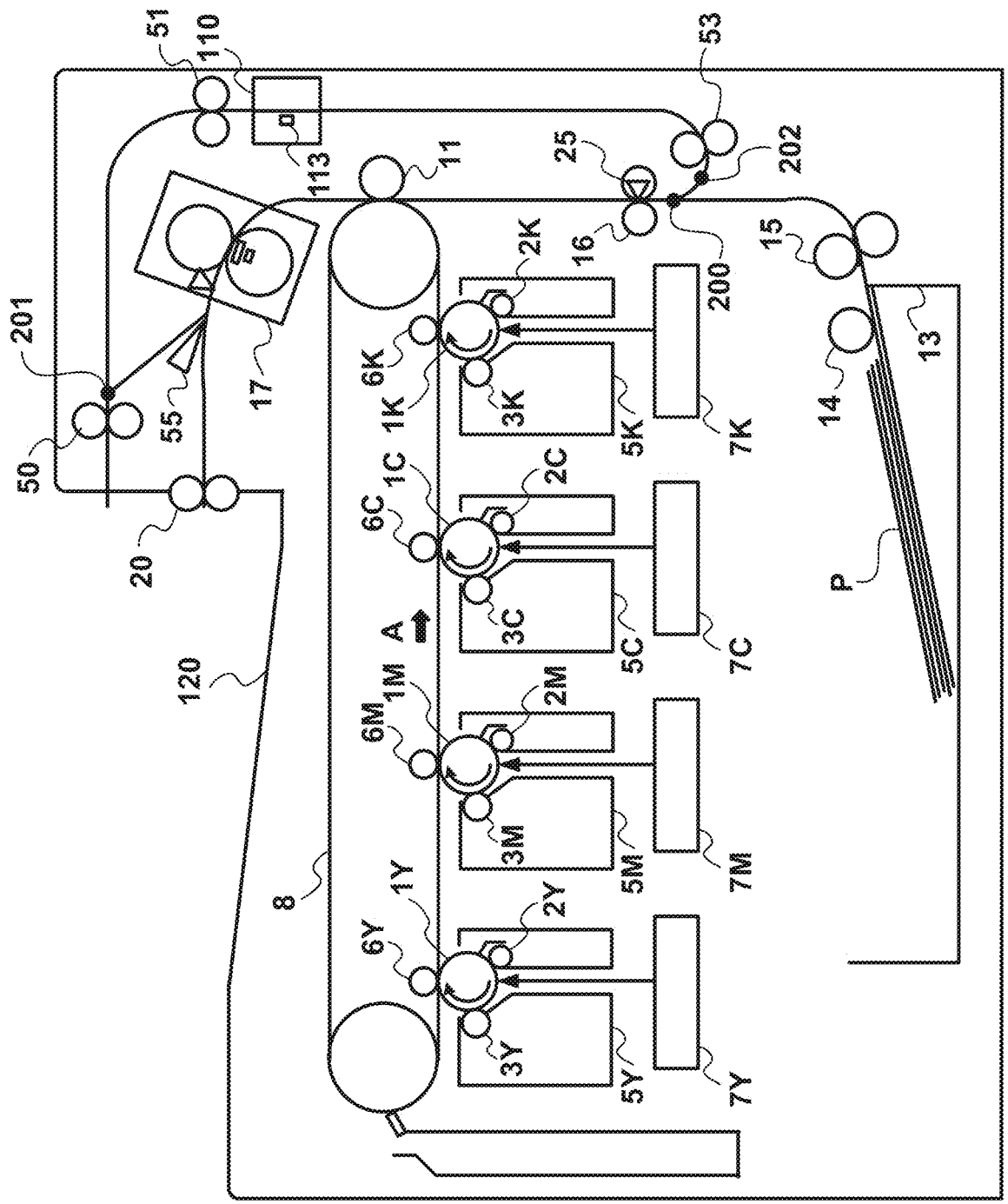
FIG. 1 is a diagram of a configuration of an image forming apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a diagram of a configuration of an image forming apparatus according to this embodiment. In FIG. 1, Y, M, C and K at the ends of reference signs indicate that the colors of toner images, with which members denoted by the reference signs are involved when the toner images were formed, are respectively yellow, magenta, cyan, and black. However, when it is not necessary to distinguish colors, reference signs without the letters at their ends are used. Photosensitive members 1 are driven and rotated in the clockwise direction of the figure when forming an image. Charging rollers 2 charge the surfaces of the corresponding photosensitive members 1 to a uniform potential. Exposure units 7 expose the corresponding photosensitive members 1 to light so as to respectively form electrostatic latent images on the surfaces of the corresponding photosensitive member 1. Developing rollers 3 of developing units 5 develop the electrostatic latent images of the corresponding photosensitive members 1 using toner, to form toner images on the surfaces of the corresponding photosensitive members 1. Primary transfer rollers 6 transfer the toner images formed on the corresponding photosensitive members 1, onto an intermediate transfer belt 8, by outputting a primary transfer bias voltage. Note that, as a result of the toner images formed on the photosensitive members 1 being overlaid and transferred onto the intermediate transfer belt 8, a full-color image can be formed. The intermediate transfer belt 8 is driven and rotated in the direction A of the figure during image formation. Accordingly, the toner image transferred onto the intermediate transfer belt 8 is conveyed to an opposing position of a secondary transfer roller 11.

On the other hand, each sheet P stored in a cassette 13 is fed to a conveyance path by a feeding roller 14, and is conveyed to the downstream side in the conveyance direction by a conveyance roller 15. A registration roller 16 conveys the sheet toward an opposing position of the secondary transfer roller 11. Note that the registration roller 16 adjusts the conveyance speed of the sheet P such that the sheet P reaches the opposing position of the secondary transfer roller 11 at the timing when a toner image formed on the intermediate transfer belt 8 reaches the opposing position of the secondary transfer roller 11. Note that this adjustment is performed based on the timing when a registration sensor 25 detects the sheet P. The secondary transfer roller 11 transfers the toner image of the intermediate transfer belt 8 onto the sheet P by outputting a secondary transfer bias voltage. Hereinafter, the opposing position of the secondary transfer roller 11 at which the toner image of the intermediate transfer belt 8 is transferred onto the sheet P is referred to as an "image formation position" or "transfer position".

The sheet P onto which the toner image has been transferred is conveyed to a fixing unit 17. The fixing unit 17 fixes the toner image to the sheet P by applying heat and pressure to the sheet P. The image forming apparatus according to this embodiment can form images respectively on the two sides of a sheet P. In the following description, a side of a sheet P on which an image is formed first is referred to as a "first side", and the opposite side of the first side is referred to as a "second side". When an image is formed only on the first side of a sheet P, and the first side of the sheet P is not read, the sheet P to which the toner image is fixed is discharged to a tray 120 by a discharge roller 20. Note that, at this time, a flapper 55 is set to an orientation for guiding the sheet P to the discharge roller 20.

When an image is formed on the second side of a sheet P, or when the first side of the sheet P is read, the sheet P with a toner image fixed thereto on the first side is conveyed to a reversing roller 50 via a reversing point 201. Note that, at this time, the flapper 55 is set to an orientation for guiding the sheet P to the reversing point 201. When the trailing edge of the sheet P proceeds beyond the reversing point 201, the reversing roller 50 is rotated in the opposite direction to the current direction, and thereby the sheet P is conveyed toward a circulatory conveyance path. Note that, in this embodiment, the circulatory conveyance path refers to a section from the reversing point 201 to a joining point 200 via a waiting point 202. On the circulatory conveyance path, the sheet P is conveyed by a conveyance roller 51 and a refeeding roller 53. Thereafter, the sheet P is conveyed to the image formation position again by the registration roller 16, and a toner image is transferred onto the second side of the sheet P. In addition, a reading unit 110 is provided between the conveyance roller 51 and the refeeding roller 53, and includes a CIS 113. The CIS 113 can read the first side of the sheet P on which an image is formed, the sheet P being conveyed on the circulatory conveyance path. The reading unit 110 outputs image information of the first side of the sheet P that has been read, to a CPU 104 of a printer control unit 101 (FIG. 2).

Figure 2:
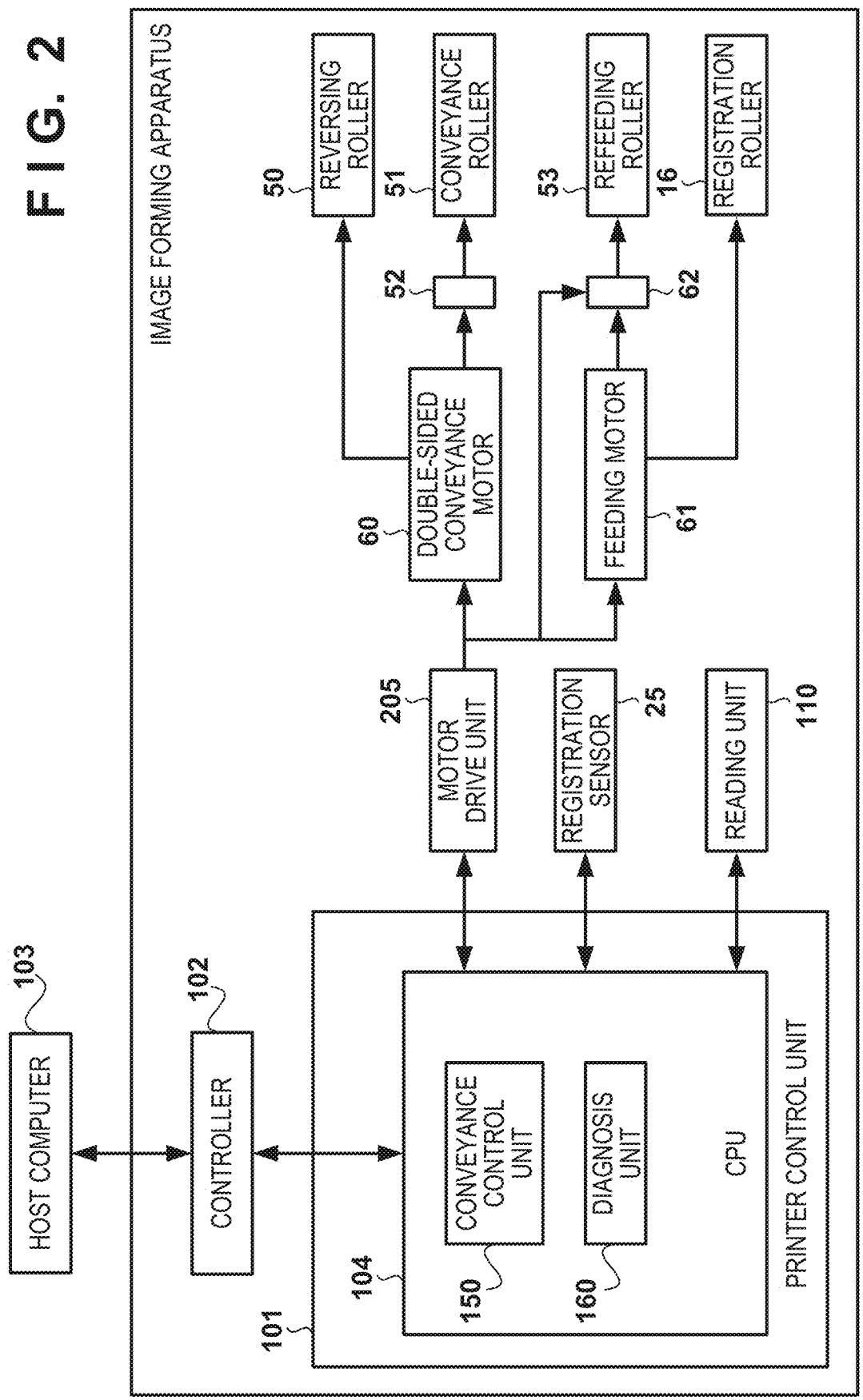
FIG. 2 is a block diagram of an image forming apparatus according to an embodiment of the present invention.

FIG. 2 is a diagram of a control configuration of the image forming apparatus according to this embodiment. Upon receiving, from a host computer 103, image data and an instruction to form an image that is based on the image data, a controller 102 instructs the printer control unit 101 to perform image formation. Upon receiving the image formation instruction, the CPU 104 of the printer control unit 101 controls the members shown in FIG. 1 so as to form an image on a sheet P. A motor drive unit 205 controls rotation of a double-sided conveyance motor 60 and a feeding motor 61, and controls the state of a clutch 62, under the control of the CPU 104. Note that drive force of the double-sided conveyance motor 60 is transmitted to the reversing roller 50 and the conveyance roller 51. Note that drive force is transmitted to the conveyance roller 51 via a one-way clutch 52. Therefore, only drive force for rotating the conveyance roller 51 in a direction in which the sheet P is conveyed toward the reading unit 110 is transmitted to the conveyance roller 51. Note that the double-sided conveyance motor 60 is driven and rotated in two directions in order to rotate the reversing roller 50 in the two directions. In the following description, the rotation direction of the double-sided conveyance motor 60 for rotating both the reversing roller 50 and the conveyance roller 51 so as to convey the sheet P toward the reading unit 110 is referred to as a "forward direction", and the opposite rotation direction to the forward direction is referred to as a "backward direction". In addition, a state where the reversing roller 50 is rotated by rotation of the double-sided conveyance motor 60 in the forward direction is referred to as "forward rotation", and a state where the reversing roller 50 is rotated by rotation of the double-sided conveyance motor 60 in the backward direction is referred to as "backward rotation". Note that, as described above, while the double-sided conveyance motor 60 is rotated in the backward direction, the conveyance roller 51 does not rotate due to the one-way clutch 52.

Drive force of the feeding motor 61 is transmitted to the registration roller 16 and the refeeding roller 53. Note that the CPU 104 can shut off transmission of drive force to the refeeding roller 53 by controlling the state of the clutch 62. In this embodiment, when the clutch 62 is in an ON-state, drive force of the feeding motor 61 is transmitted to the refeeding roller 53, and, when the clutch 62 is in an OFF-state, drive force of the feeding motor 61 is not transmitted to the refeeding roller 53. In addition, the CPU 104 obtains, from the registration sensor 25, a signal indicating the detection state of a sheet. Furthermore, the CPU 104 controls the reading unit 110. Specifically, the CPU 104 causes the reading unit 110 to read an image on a sheet P, and obtains image information of the read image from the reading unit 110.

The CPU 104 functions as a conveyance control unit 150 and a diagnosis unit 160 by executing a program stored in a nonvolatile memory (not illustrated). Note that a configuration can be adopted in which one of the conveyance control unit 150 and the diagnosis unit 160 or both the functional blocks are realized by a dedicated circuit outside of the CPU 104, for example, an ASIC. In addition, a configuration can also be adopted in which a portion of processing of any functional block out of the conveyance control unit 150 and the diagnosis unit 160 is executed by an external dedicated circuit such as an ASIC, and the remaining processing is executed by the CPU 104. Furthermore, the printer control unit 101 includes a volatile memory (not illustrated) that stores various types of information that are used for the CPU 104 to control the image forming apparatus, and information that is temporarily held by the CPU 104.

The conveyance control unit 150 performs conveyance control of sheets P. There are two types of conveyance for conveying the sheets P to the circulatory conveyance path; one is one-sheet circulatory conveyance and the other is two-sheet circulatory conveyance. The one-sheet circulatory conveyance is a conveyance manner in which, after an image is formed on the first side of a first sheet P, an image is formed on the second side of the first sheet P, and image formation is then performed on the first side of a second sheet P. In the one-sheet circulatory conveyance, image formation cannot be performed during a period from when an image is formed on the first side of a sheet P until when the sheet P is conveyed to the image formation position again via the circulatory conveyance path. Accordingly, in the one-sheet circulatory conveyance, the productivity is low. On the other hand, the two-sheet circulatory conveyance is a conveyance manner in which, after an image is formed on the first side of a first sheet P, an image is formed on the first side of a second sheet P, and image formation is then performed on the second side of the first sheet P. In the two-sheet circulatory conveyance, during a period from when an image is formed on the first side of a sheet P until when the sheet P is conveyed to the image formation position again via the circulatory conveyance path, image formation is performed on another sheet P, and thus the productivity is high. Assume that the image forming apparatus according to this embodiment can perform two-sheet circulatory conveyance when the sheet size in the conveyance direction is smaller than or equal to 297 mm (the height of A4). On the other hand, if the sheet size in the conveyance direction is larger than 297 mm, only one-sheet circulatory conveyance can be used.

Figure 3C:
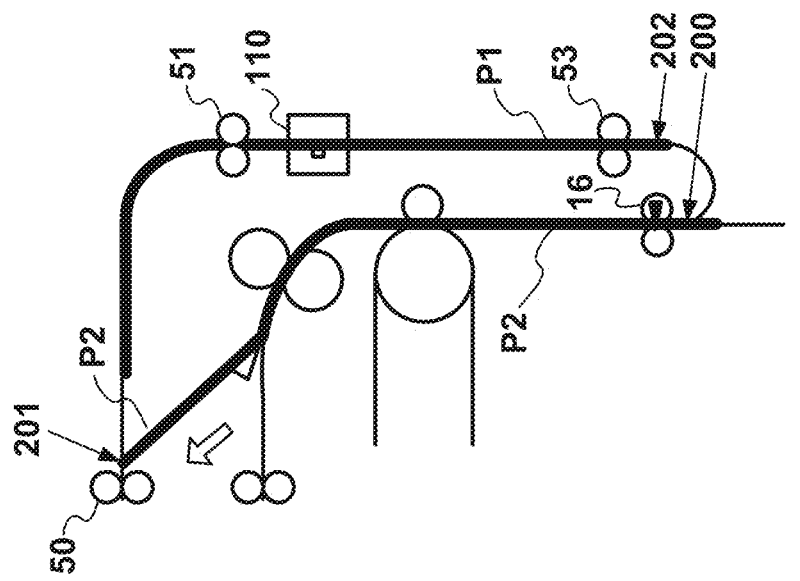
FIGS. 3A to 3C are diagrams illustrating two-sheet circulatory conveyance.
Figure 3B:
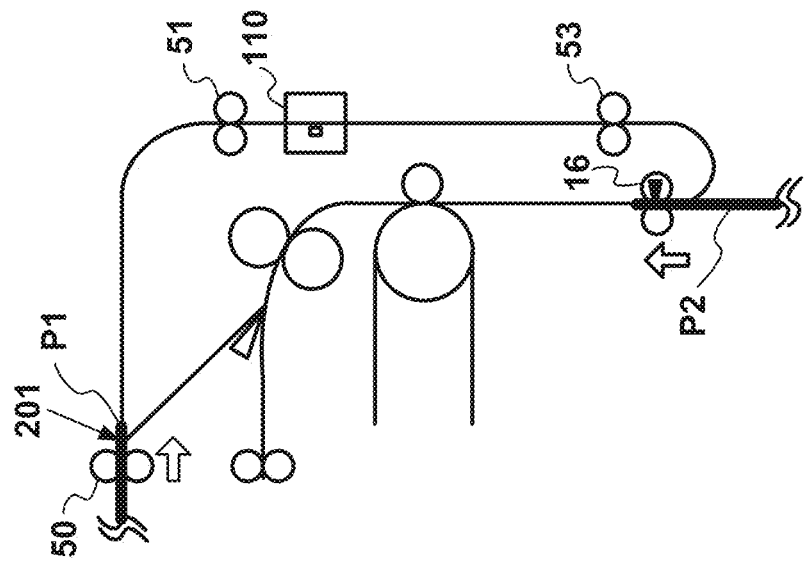
Figure 3A:
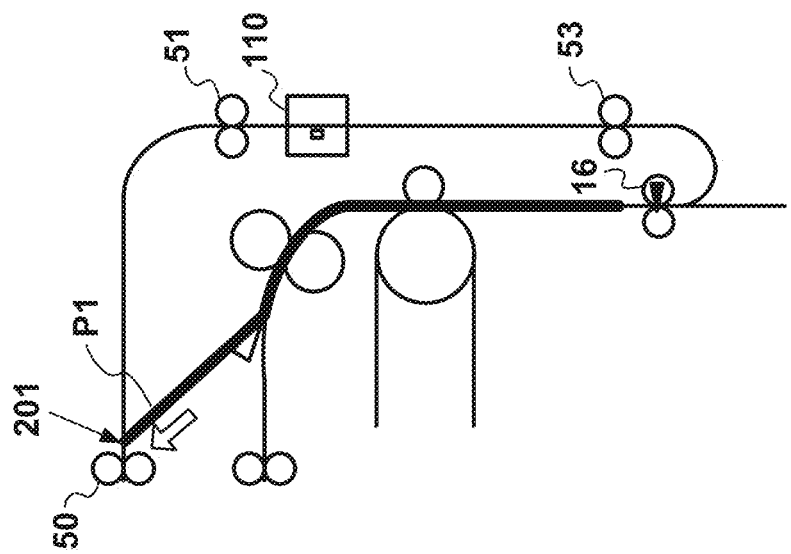
Figure 4B:
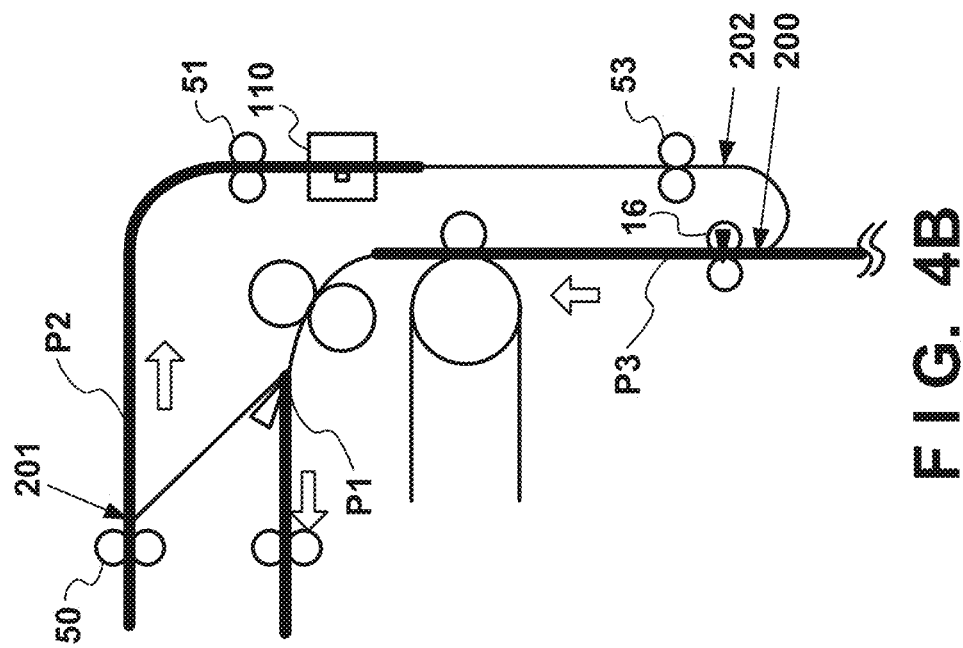
FIGS. 4A and 4B are diagrams illustrating two-sheet circulatory conveyance.
Figure 4A:
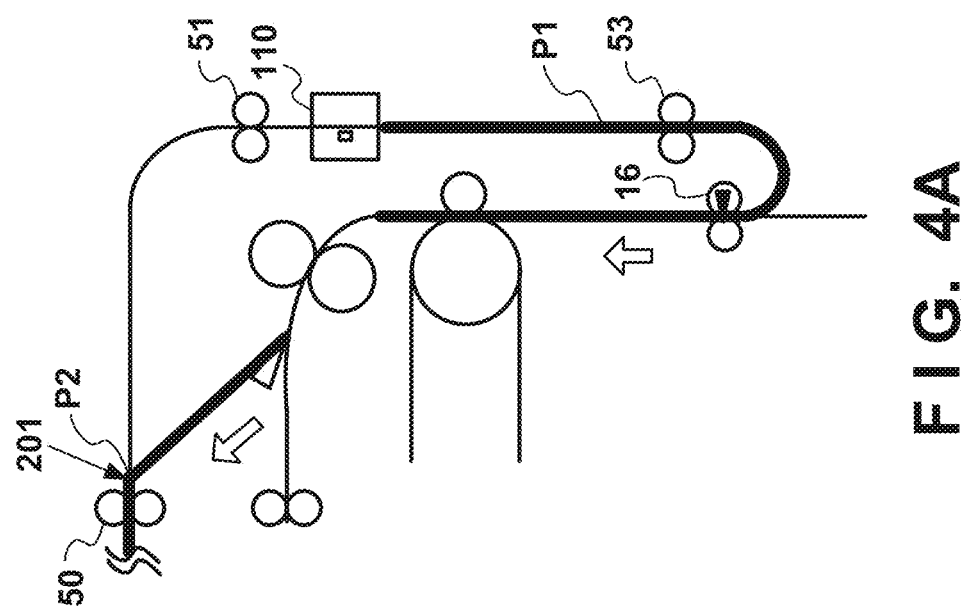

FIGS. 3A to 3C, 4A, and 4B are diagrams illustrating the two-sheet circulatory conveyance. Note that, in the following description, a sheet P that is fed $n^{th}$ (n is a natural number) in a print job is referred to as a "sheet Pn". FIG. 3A shows a state where a sheet P1 is conveyed toward the reversing point 201. Note that, in the state in FIG. 3A, image formation on the first side of the sheet P1 is also performed. FIG. 3B shows a state where the sheet P1 is conveyed toward the circulatory conveyance path by forward rotation of the reversing roller 50, and a subsequent sheet P2 reaches the registration roller 16. FIG. 3C shows a state where the sheet P2 is conveyed toward the reversing point 201. At this time, the sheet P1 waits at the waiting point 202. Note that, in the state in FIG. 3C, image formation on the first side of the sheet P2 is also performed. FIG. 4A shows a state where the sheet P2 whose first side has been subjected to image formation is conveyed by backward rotation of the reversing roller 50, and an image is formed on the second side of the sheet P1. FIG. 4B shows a state where the sheet P1 with images formed on the two sides thereof is discharged to the outside of the image forming apparatus, and an image is formed on the first side of a sheet P3. Note that the sheet P2 is conveyed toward the waiting point 202.

In this embodiment, the conveyance control unit 150 has three conveyance modes, namely a first conveyance mode, a second conveyance mode, and a third conveyance mode, as conveyance modes when sheets P are conveyed using the circulatory conveyance path. The first conveyance mode is a conveyance mode for maximizing the productivity using the above-described two-sheet circulatory conveyance. The second conveyance mode and the third conveyance mode are conveyance modes in which the above-described one-sheet circulatory conveyance is used. Note that the third conveyance mode is a conveyance mode in which the conveyance speed of a sheet P is not changed while the sheet P is passing through a reading region of the reading unit 110. On the other hand, the first conveyance mode and the second conveyance mode are modes in which the conveyance speed of a sheet P is changed while the sheet P is passing through the reading region of the reading unit 110. However, in the second conveyance mode, a period during which the conveyance speed of a sheet P that is passing through the reading region of the reading unit 110 is changed is shorter than the first conveyance mode. Note that, in the third conveyance mode, a sheet P is conveyed through the circulatory conveyance path such that the reading unit 110 reads the sheet P with an image formed on the first side, but image formation is not performed on the second side. On the other hand, in the first conveyance mode and the second conveyance mode, image formation can be performed on the second side.

Figure 5:
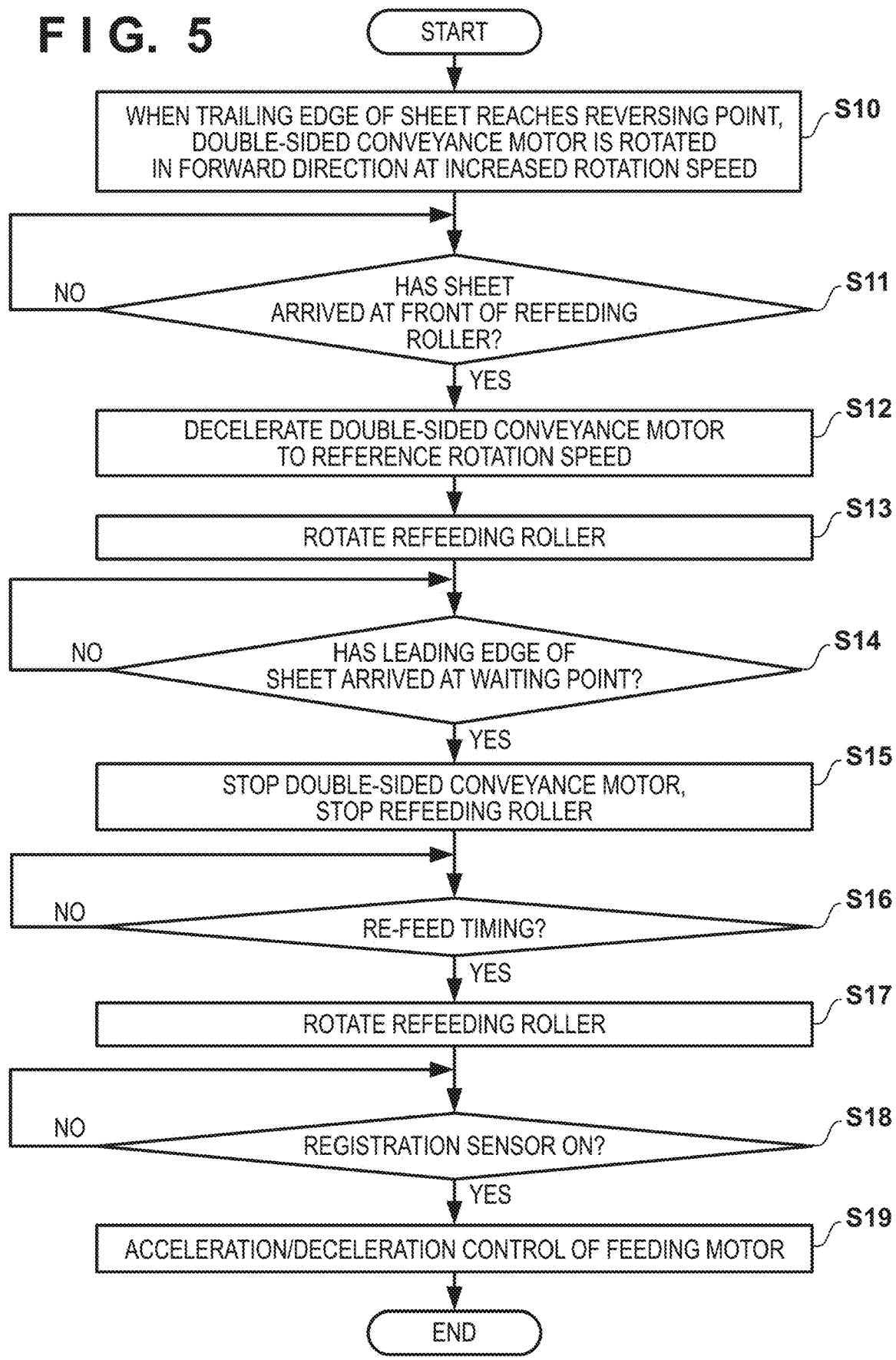
FIG. 5 is a flowchart of conveyance processing in a first conveyance mode that is executed by a conveyance control unit.

FIG. 5 is a flowchart of conveyance processing in the first conveyance mode that is executed by the conveyance control unit 150. Note that, in the following description, the conveyance speed of a sheet P when the sheet P passes through the image formation position is referred to as a "reference speed". Also, the rotation speed of the double-sided conveyance motor 60 and the feeding motor 61 for conveying the sheet P at the reference speed is referred to as a "reference rotation speed". In addition, as will be described below, there are cases where the double-sided conveyance motor 60 conveys the sheet P at an increased speed that is higher than the reference speed. The rotation speed of the double-sided conveyance motor 60 for conveying the sheet P at this increased speed is hereinafter referred to as "increased rotation speed". For example, the increased speed is 1.5 times the reference speed. The conveyance control unit 150 conveys the sheet P at the reference speed, and an image is formed on the first side of the sheet P. When the trailing edge of the sheet P reaches the reversing point 201, the conveyance control unit 150 starts rotation of the double-sided conveyance motor 60 in the forward direction, and conveys the sheet P to the circulatory conveyance path, in step S10. At this time, the conveyance control unit 150 increases the rotation speed of the double-sided conveyance motor 60 to the increased rotation speed, and increases the conveyance speed of the sheet P to the increased speed. As a result of changing the conveyance speed of the sheet P to the increased speed, the trailing edge of the sheet P and the leading edge of a subsequent sheet P are prevented from interfering with each other at the reversing point 201. The conveyance control unit 150 then conveys the sheet P toward the waiting point 202. In step S11, the conveyance control unit 150 waits until the leading edge of the sheet P is conveyed to a predetermined position upstream of the refeeding roller 53. When the leading edge of the sheet P reaches the predetermined position upstream of the refeeding roller 53, the conveyance control unit 150 decreases the speed of the double-sided conveyance motor 60 to the reference rotation speed, in step S12. In addition, in step S13, the conveyance control unit 150 controls the clutch 62 so as to rotate the refeeding roller 53. The conveyance control unit 150 then waits until the leading edge of the sheet P reaches the waiting point 202. When the leading edge of the sheet P reaches the waiting point 202, the conveyance control unit 150 stops the double-sided conveyance motor 60, and controls the clutch 62 so as to stop rotation of the refeeding roller 53, in step S15. Accordingly, the sheet P stops at the waiting point 202.

Next, in step S16, the conveyance control unit 150 stops conveyance of the sheet P until a refeeding timing arrives. Note that the refeeding timing is determined based on a timing for forming an image that is to be transferred onto the second side of the sheet P. When the refeeding timing arrives, the conveyance control unit 150 controls, in step S17, the clutch 62 so as to rotate the refeeding roller 53, and resume conveyance of the sheet P. Next, in step S18, the conveyance control unit 150 waits until the registration sensor 25 detects the sheet P. When the registration sensor 25 detects the sheet P, the conveyance control unit 150 performs acceleration/deceleration control of the feeding motor 61 so as to control/adjust the conveyance speed of the sheet, in step S19. The purpose of this process is to convey the sheet P to the image formation position at the timing when the toner image on the intermediate transfer belt 8 is conveyed to the image formation position.

Note that, when the reading unit 110 reads an image on a sheet P while the sheet P is conveyed through the circulatory conveyance path, the conveyance control unit 150 notifies the reading unit 110 of a period during which the sheet P passes through the reading region of the reading unit 110. Note that whether or not to read an image is determined in accordance with whether or not the diagnosis unit 160 diagnoses the image.

Figure 6A:
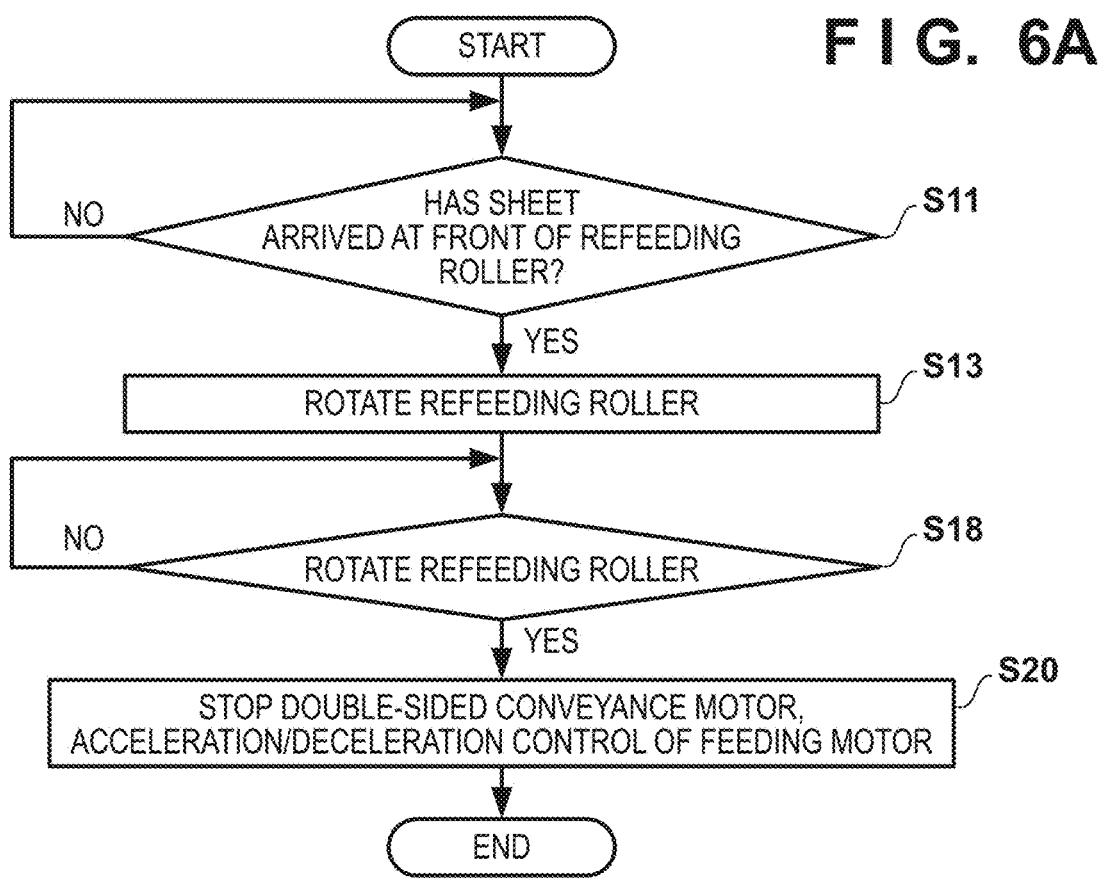
FIG. 6A is a flowchart of conveyance processing in a second conveyance mode that is executed by the conveyance control unit.
Figure 6B:
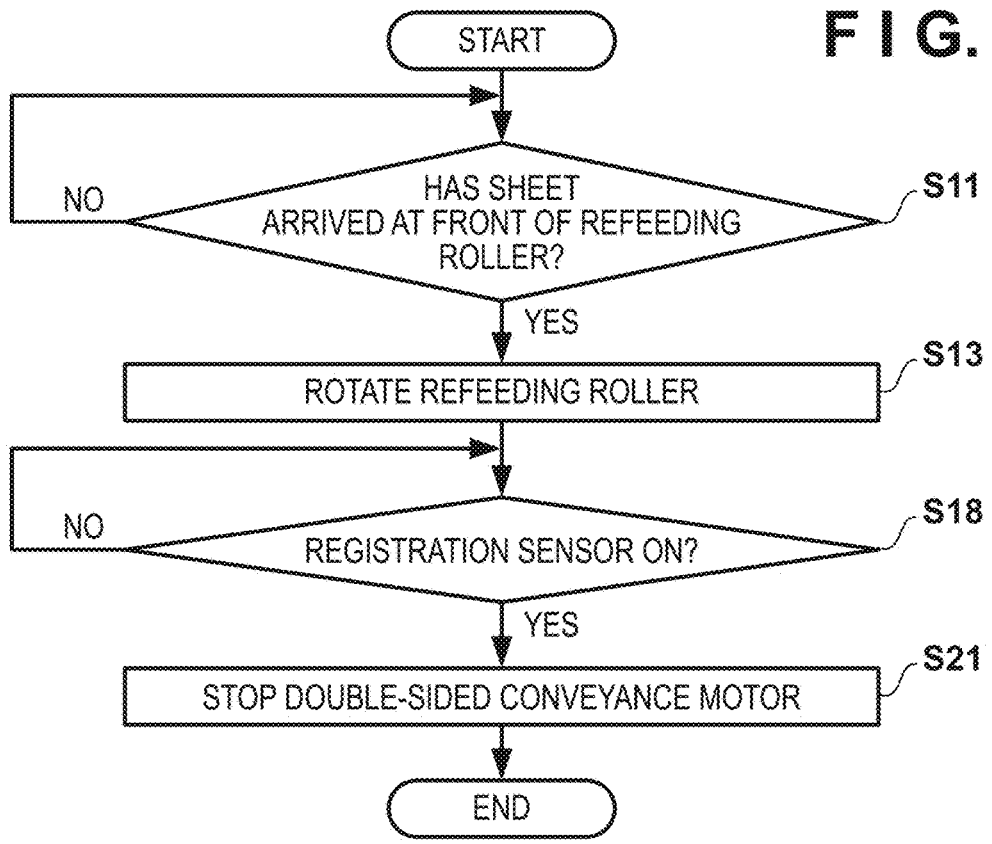
FIG. 6B is a flowchart of conveyance processing in a third conveyance mode that is executed by the conveyance control unit.

FIG. 6A is a flowchart of conveyance processing in the second conveyance mode that is executed by the conveyance control unit 150. Note that the same step numbers are assigned to processing steps similar to those of the conveyance processing in the first conveyance mode, and a detailed description thereof is omitted. In the second conveyance mode, in step S11, the conveyance control unit 150 waits until the leading edge of a sheet P with an image formed on the first side thereof is conveyed to the predetermined position upstream of the refeeding roller 53. Note that, during this period, the sheet P is conveyed at the reference speed. When the leading edge of the sheet P reaches the predetermined position upstream of the refeeding roller 53, the conveyance control unit 150 controls the clutch 62 so as to rotate the refeeding roller 53, in step S13. Next, in step S18, the conveyance control unit 150 waits until the registration sensor 25 detects the sheet P. When the registration sensor 25 detects the sheet P, the conveyance control unit 150 stops the double-sided conveyance motor 60, performs acceleration/deceleration control of the feeding motor 61, and controls the conveyance speed of the sheet, in step S20. FIG. 6B is a flowchart of conveyance processing in the third conveyance mode that is executed by the conveyance control unit 150. The only difference from the second conveyance mode is that, when the registration sensor 25 detects the sheet P in step S18, the double-sided conveyance motor 60 is stopped in step S20, but acceleration/deceleration control of the feeding motor 61 is not performed, and the sheet P is conveyed at the reference speed. This is because, in the third conveyance mode, no image is formed on the second side of the sheet P, and thus it is not necessary to adjust the timing when the sheet P reaches the image formation position.

Figure 7:
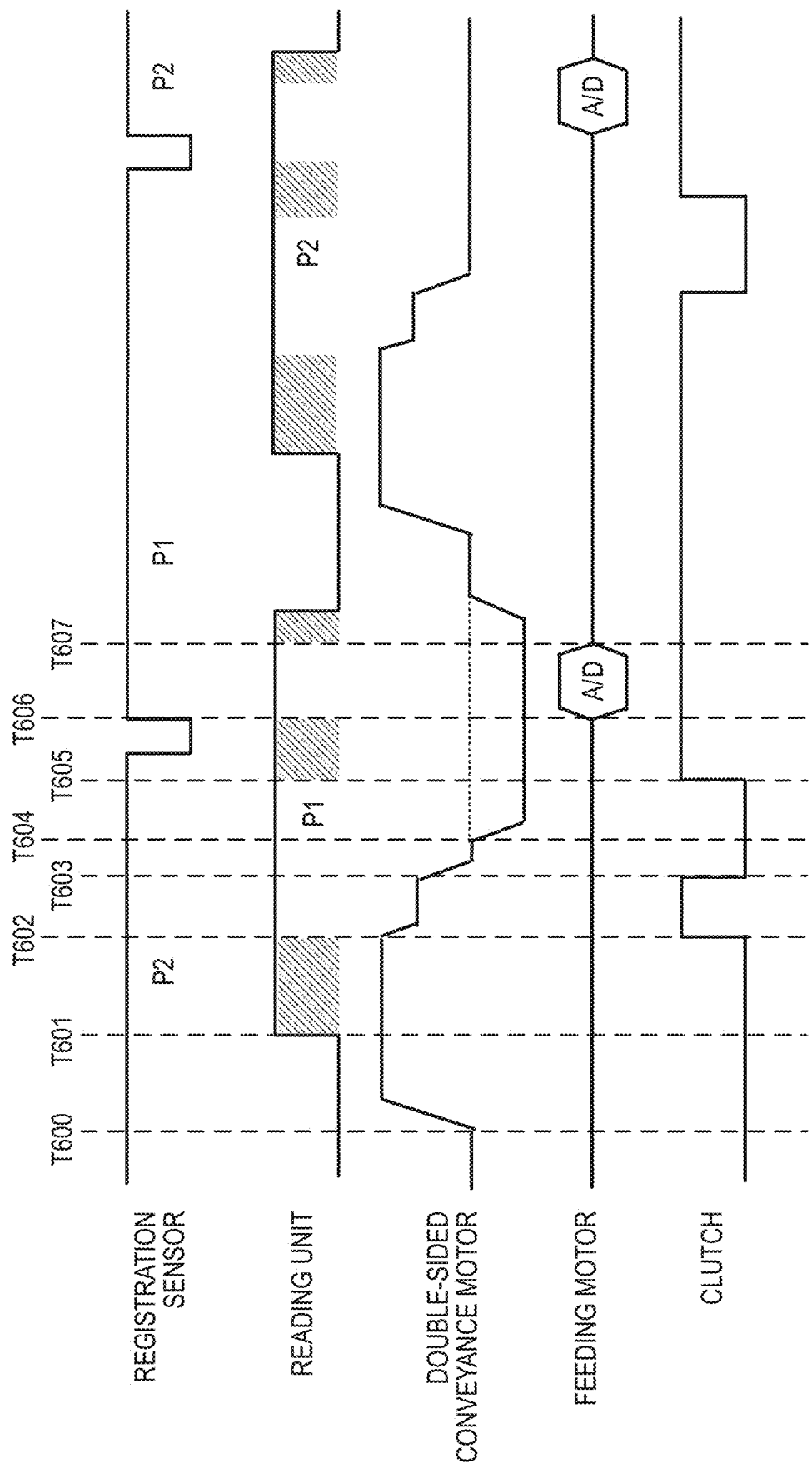
FIG. 7 is a timing chart of the first conveyance mode.
Figure 8:
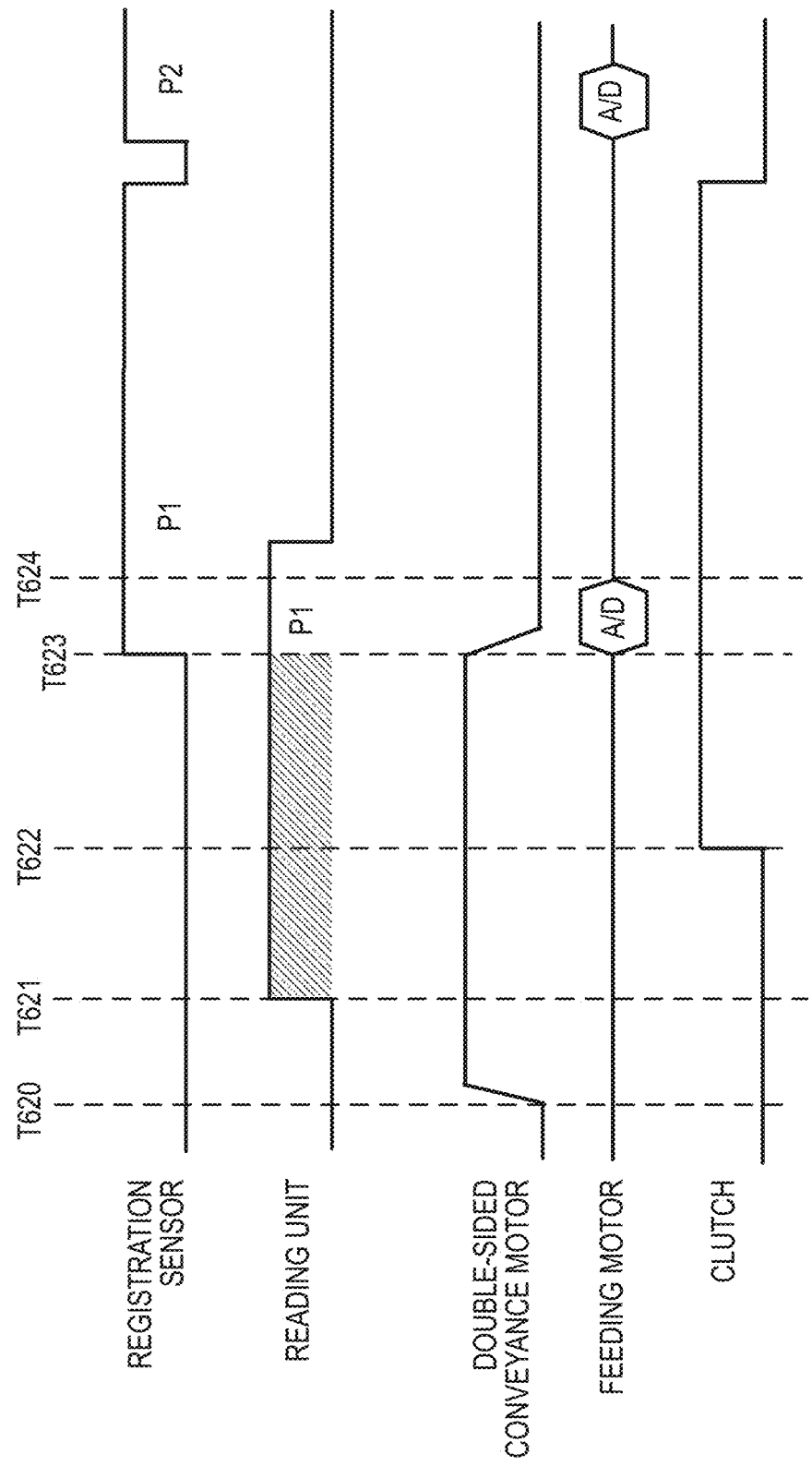
FIG. 8 is a timing chart of the second conveyance mode.

FIGS. 7 to 9 respectively show timing charts for the first conveyance mode, the second conveyance mode, and the third conveyance mode. Note that, in all of FIGS. 7 to 9, the timing when the trailing edge of a sheet P1 with an image formed on the first side reached the reversing point 201 is a start point in the charts. Note that a high level in a chart corresponding to the registration sensor 25 indicates a state where the registration sensor 25 has detected a sheet P, and a low level indicates a state where the registration sensor 25 has not detected a sheet P. The chart also indicates whether or not the detected sheet is a sheet P1 or a sheet P2. In addition, a high level in a chart corresponding to the reading unit 110 indicates a case where there is a sheet P in the reading region of the reading unit 110, and a low level indicates a state where there is no sheet P in the reading region of the reading unit 110. Note that this chart also indicates whether or not the sheet that is in the reading region is the sheet P1 or the sheet P2. Furthermore, a chart corresponding to the double-sided conveyance motor 60 indicates a rotation speed. Note that an initial state is a state where the double-sided conveyance motor 60 is stopped, and the level above the initial state indicates a state where the double-sided conveyance motor 60 is rotating in the forward direction, and the level below the initial state indicates a state where the double-sided conveyance motor 60 is rotating in the backward direction. In addition, an "A/D" portion of a chart corresponding to the feeding motor 61 indicates that acceleration/deceleration control is being performed. Note that, during a period other than that of the "A/D" portion of the chart, the feeding motor 61 is driven and rotated at the reference rotation speed. In addition, a high level in a chart corresponding to the clutch 62 indicates that the clutch 62 is in an ON state, and a low level indicates that the clutch 62 is in an OFF state.

A time T600 in FIG. 7 refers to the timing for starting rotation of the double-sided conveyance motor 60 in the forward direction, based on the trailing edge of the sheet P1 having passed through the reversing point 201. Accordingly, acceleration of the double-sided conveyance motor 60 to the increased rotation speed is started at the time T600. Thereby, the sheet P1 is conveyed toward the circulatory conveyance path at the increased speed. A time T601 refers to the timing when the leading edge of the sheet P1 reaches the reading region of the reading unit 110. A time T602 refers to the timing when the leading edge of the sheet P1 reaches the predetermined position upstream of the refeeding roller 53. In other words, it is a timing for starting to decrease the speed of the double-sided conveyance motor 60 such that the rotation speed of the double-sided conveyance motor 60 reaches the reference rotation speed and switching on the clutch 62. A time T603 refers to the timing when the sheet P1 reaches the waiting point 202. In other words, it is a timing for stopping the double-sided conveyance motor 60, and switching off the clutch 62. A time T604 refers to the timing when the leading edge of the sheet P2 reaches the reversing point 201. At the time T604, the conveyance control unit 150 starts rotation of the double-sided conveyance motor 60 in the backward direction in order to convey the sheet P2 using the reversing roller 50.

A time T605 refers to the timing for refeeding the sheet P1, and the conveyance control unit 150 switches on the clutch 62, and resumes conveyance of the sheet P1. A time T606 refers to the timing when the registration sensor 25 detects the sheet P1. The conveyance control unit 150 starts acceleration/deceleration control of the feeding motor 61 at the time T606 in order to adjust the timing when the sheet P1 reaches the image formation position. A time T607 refers to the timing for ending acceleration/deceleration control of the feeding motor 61. From that point on, similar conveyance control is performed on the sheet P2.

In the first conveyance mode, while the sheet P is passing through the reading region of the reading unit 110, the conveyance speed of the sheet P is not constant, and changes a plurality of times. In FIG. 7, the shaded regions of periods during which the chart corresponding to the reading unit 110 is at the high level indicate periods during which the conveyance speed of the sheet is constant, and other regions of the periods during which the chart is at the high level indicate periods during which the conveyance speed of the sheet changes.

A time T620 in FIG. 8 refers to a timing for starting rotation of the double-sided conveyance motor 60 in the forward direction, based on the trailing edge of the sheet P1 having passed through the reversing point 201. Note that the double-sided conveyance motor 60 is accelerated to the reference rotation speed. Accordingly, the sheet P1 is conveyed toward the circulatory conveyance path at the reference speed. A time T621 refers to the timing when the leading edge of the sheet P1 reaches the reading region of the reading unit 110. A time T622 refers to a timing when the leading edge of the sheet P1 reaches the predetermined position upstream of the refeeding roller 53. In other words, it is a timing for switching on the clutch 62. A time T623 refers to the timing when the registration sensor 25 detects the sheet P1, and the conveyance control unit 150 executes acceleration/deceleration control of the feeding motor 61 in order to adjust the timing when the sheet P1 reaches the image formation position. A time T624 refers to the timing when acceleration/deceleration control of the feeding motor 61 ends. In the second conveyance mode, the conveyance speed of the sheet P changes while the trailing edge portion of that sheet (after the time T623) is passing through the reading region of the reading unit 110, but the conveyance speed until then is constant.

A time T640 in FIG. 9 refers to the timing for starting rotation of the double-sided conveyance motor 60 in the forward direction, based on the trailing edge of the sheet P1 having passed through the reversing point 201. Note that the double-sided conveyance motor 60 is accelerated up to the reference rotation speed. Accordingly, the sheet P1 is conveyed toward the circulatory conveyance path at the reference speed. A time T641 refers to the timing when the leading edge of the sheet P1 reached the reading region of the reading unit 110. A time T642 represents the timing when the leading edge of the sheet P1 reaches the predetermined position upstream of the refeeding roller 53. In other words, it is a timing for switching on the clutch 62. A time T643 refers to the timing when the registration sensor 25 detects the sheet P1. Note that, in the third conveyance mode, image formation on the second side is not performed, and thus acceleration/deceleration control of the feeding motor 61 is not executed. In the third conveyance mode, the conveyance speed of the sheet P does not change and is constant while the sheet P is passing through the reading region of the reading unit 110.

Next, image diagnostic processing that is executed by the diagnosis unit 160 will be described. The diagnosis unit 160 obtains difference image information based on the difference between image information used for image formation on the first side of a sheet P (original image information) and image information on the first side read by the reading unit 110 (read image information), and performs diagnosis for an image failure using a difference image corresponding to this difference image information as an image to be analyzed. Note that, when obtaining the difference, the positions of the two images are adjusted such that the difference between an image corresponding to the original image information (an original image) and an image corresponding to the read image information (read image) is minimized. The diagnosis unit 160 according to this embodiment executes three types of diagnostic processing, namely, first diagnostic processing, second diagnostic processing, and third diagnostic processing.

Figure 10A:
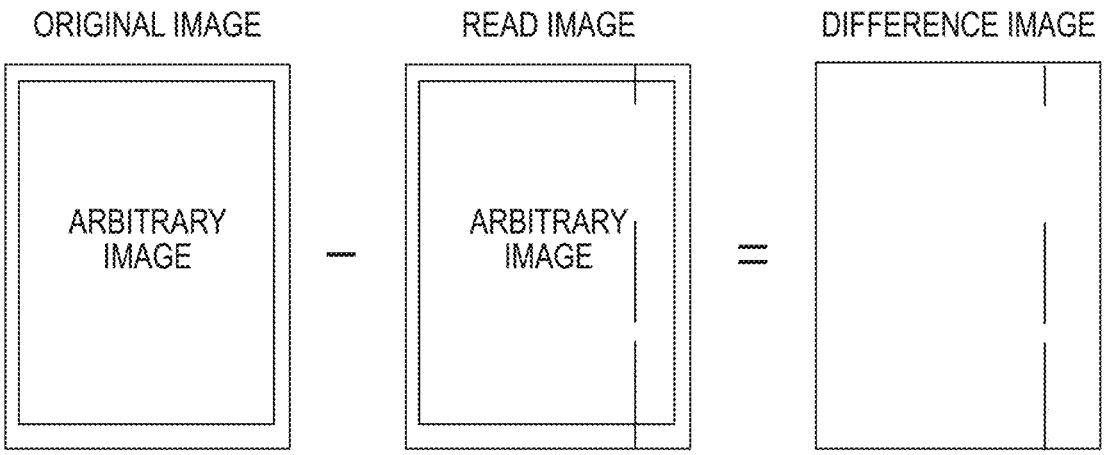
FIGS. 10A to 10C are diagrams illustrating diagnostic processing that is executed by a diagnosis unit.

The first diagnostic processing is processing for detecting occurrence of an image failure called "vertical lines" or "vertical streaks", namely a toner image of one or more lines (or a toner image of one or more streaks) in the conveyance direction of a sheet P (hereinafter, also referred to as a "vertical direction") being formed on the sheet P, which is not included in the original image. FIG. 10A shows an original image, a read image in which vertical lines have been generated, and a difference image obtained based on the difference between the original image and the read image. In the difference image, a toner image of lines has been generated. The diagnosis unit 160 applies a Sobel filter for emphasizing the edges in the vertical direction to the difference image, and obtains average values of image density in the vertical direction, in the image information that has been subjected to edge enhancement. The diagnosis unit 160 then determines that an image failure of vertical lines has occurred if the obtained average values include a value that is larger than or equal to a predetermined threshold.

Figure 10B:
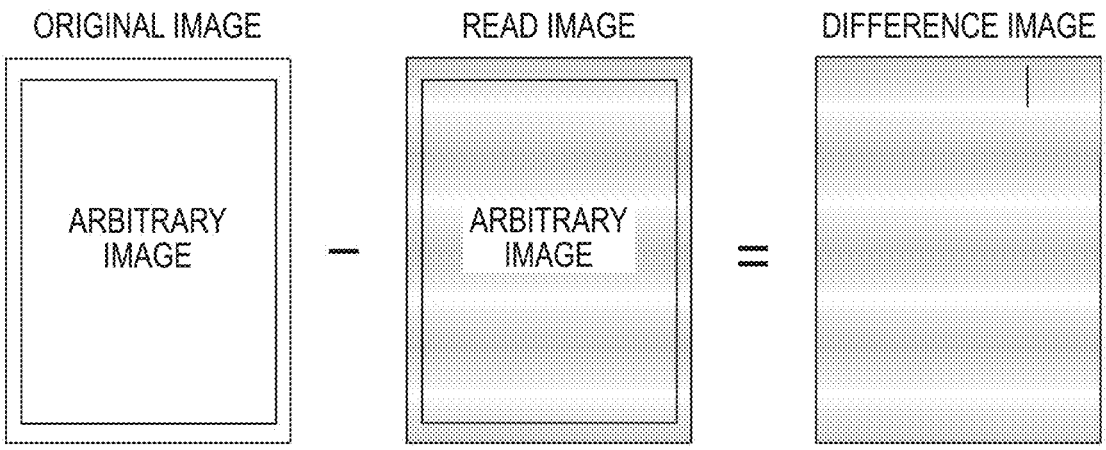

The second diagnostic processing is processing for detecting occurrence of an image failure called "cyclic unevenness", namely cyclic density change in the vertical direction. Cyclic unevenness occurs due to an uneven rotation speed of the photosensitive member 1 and the developing roller 3, uneven charging, and the like. FIG. 10B shows an original image, a read image in which cyclic unevenness has occurred, and a difference image obtained based on the difference between the original image and the read image. In the difference image, cyclic density change has occurred. The diagnosis unit 160 performs discrete Fourier transform in the vertical direction on difference image information corresponding to the difference image, and obtains an average value for each frequency component. If there is a frequency component for which the average value is larger than or equal to a predetermined threshold, it is determined that an image failure of cyclic unevenness has occurred.

Figure 10C:
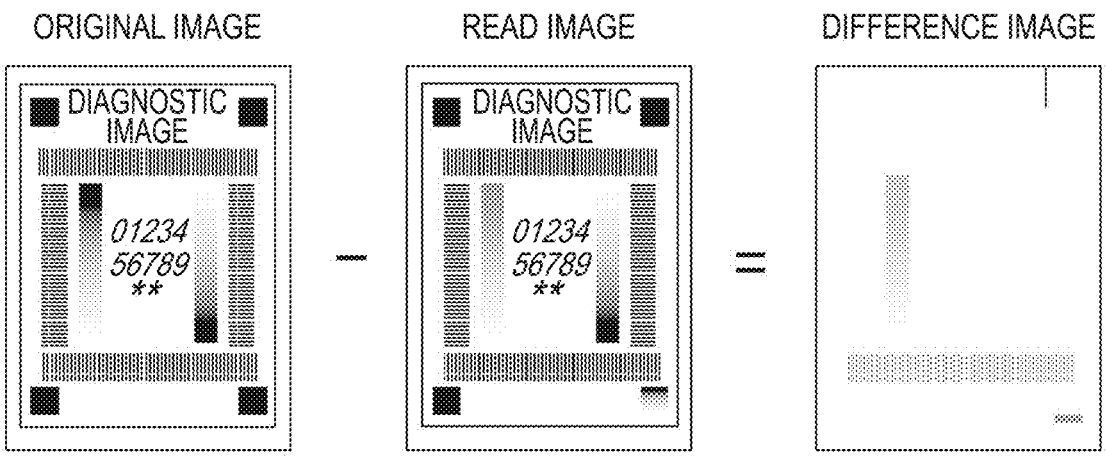

The third diagnostic processing is comprehensive diagnostic processing that is performed by forming a diagnostic image on a sheet P. The original image in FIG. 10C represents an example of the diagnostic image. The diagnostic image includes a pattern suitable for detection of various image failures, for each predetermined detection region, in order to detect a plurality of image failures at the same time. In the diagnosis unit 160, an AutoEncoder trained in advance using an original image when there is no image failure is provided for each detection region. In addition, a threshold is set for each detection region in advance. The diagnosis unit 160 obtains the difference between output obtained by inputting image information of a detection region of the read image to the AutoEncoder of that detection region and image information of that detection region of the original image, and obtains a root mean value in that detection region. If the root mean value is larger than or equal to a threshold of that detection region, the diagnosis unit 160 determines that an image failure to be detected of that detection region has occurred. In the third diagnostic processing, no difference image is obtained, but FIG. 10C shows a difference image for reference. Note that FIG. 10C shows only one diagnostic image, but a configuration can also be adopted in which a plurality of diagnostic images are formed on a plurality of sheets P, and the third diagnostic processing is performed.

The first diagnostic processing, the second diagnostic processing, and the third diagnostic processing are different from each other in the region of a read image required for detecting an image failure, more specifically, in the range in the vertical direction (conveyance direction of the sheet P). Specifically, in the third diagnostic processing, the entire diagnostic image is required for determination of an image failure. Therefore, in the third diagnostic processing, the range of a read image in the vertical direction required for diagnosis is the largest. On the other hand, the second diagnostic processing only requires an image portion of a range that is larger than or equal to the cycle of cyclic unevenness to be detected, and does not require the entire image region as in the third diagnostic processing. That is to say, the range in the vertical direction required for the second diagnostic processing is smaller than the range in the vertical direction required for the third diagnostic processing. In addition, in the first diagnostic processing, if there are vertical lines, they can be detected, and a range that is larger than or equal to the cycle of cyclic unevenness to be detected is not required as in the second diagnostic processing. Therefore, the range in the vertical direction required for the first diagnostic processing is smaller than the range in the vertical direction required for the second diagnostic processing.

When an execution condition for each diagnostic type is satisfied, the diagnosis unit 160 performs diagnostic processing for which the execution condition has been satisfied. At this time, the diagnosis unit 160 notifies the conveyance control unit 150 of the type of diagnosis to be executed, and the conveyance control unit 150 conveys a sheet P in a conveyance mode corresponding to the notified diagnostic type. Note that, in this embodiment, each diagnostic processing is executed in a first print job inputted by the user after the execution condition has been satisfied. For example, the execution condition of the first diagnostic processing is satisfied every time printing is performed on a first predetermined number of sheets, and the execution condition of the second diagnostic processing is satisfied every time printing is performed on a second predetermined number of sheets. As an example, the first predetermined number of sheets is 100, and the second predetermined number of sheets is 500. Note that the execution condition of the third diagnostic processing is satisfied when the user inputs, via the host computer 103, an instruction to execute diagnosis. Being performed using an image that is printed by the user, the first diagnostic processing and the second diagnostic processing are not immediately started even if the execution conditions are satisfied, and, when the user inputs a print instruction via the host computer 103, the first diagnostic processing and the second diagnostic processing are performed in the print job. On the other hand, the third diagnostic processing is performed using a diagnostic image, not an image that is to be printed by the user, and thus, when the user inputs an instruction to execute diagnosis, a print job for forming a diagnostic image is generated, and the third diagnostic processing is immediately started. Note that a configuration can also be adopted in which, when any other criterion is satisfied, the diagnosis unit 160 carries out the third diagnostic processing. Also in this case, when the execution condition of the third diagnostic processing is satisfied, a print job for forming a diagnostic image is generated, and the third diagnostic processing is immediately started.

Figure 11:
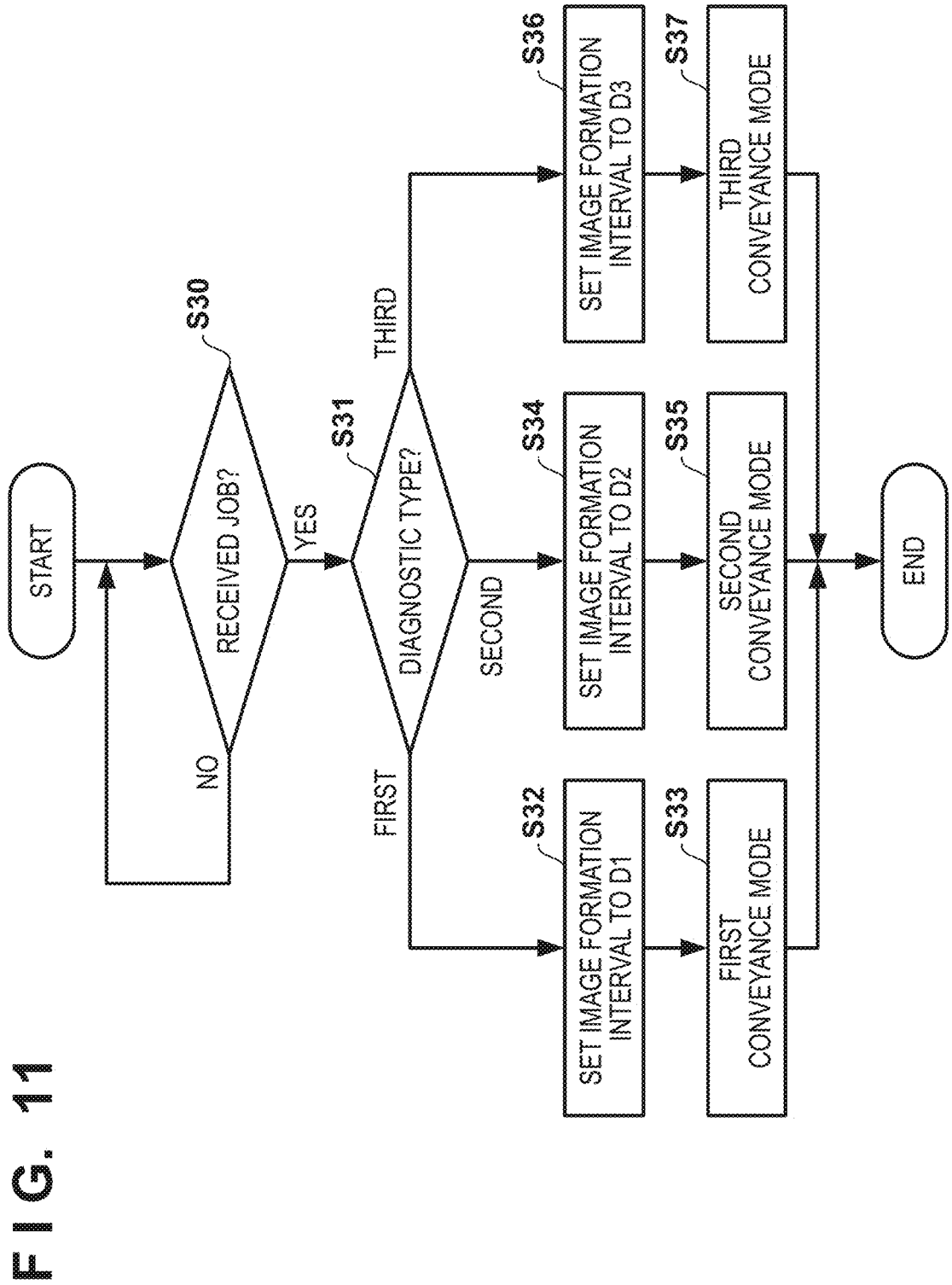
FIG. 11 is a flowchart of processing for selecting a conveyance mode that is executed by the conveyance control unit.

FIG. 11 is a flowchart of processing for selecting a conveyance mode corresponding to a diagnostic type, the processing being performed by the conveyance control unit 150. In step S30, the conveyance control unit 150 waits until a print job is received from the controller 102. Upon receiving a print job, the conveyance control unit 150 performs determination on the type of diagnosis requested by the controller 102 to carry out, in step S31. If the diagnostic type is the first diagnostic processing, the conveyance control unit 150 sets an image formation interval to D1 in step S32, and selects the first conveyance mode in step S33. Note that the image formation interval will be described later. When the diagnostic type is the second diagnostic processing, the conveyance control unit 150 sets the image formation interval to D2 in step S34, and selects the second conveyance mode in step S35. If the diagnostic type is the third diagnostic processing, the conveyance control unit 150 sets the image formation interval to D3 in step S36, and selects the third conveyance mode in step S37.

If the first diagnostic processing and the second diagnostic processing are executed by the diagnosis unit 160, the CPU 104 causes the reading unit 110 to read the first side of any at least one sheet P of the print job. The diagnosis unit 160 then determines whether or not an image failure has occurred based on the reading result of the first side of the at least one sheet P. Note that, in the first conveyance mode, as shown in FIG. 7, there are a plurality of ranges in which the sheet P can be read by the reading unit 110 in a stable manner; specifically, there are three ranges in the example in FIG. 7. The first diagnostic processing according to this embodiment is performed based on the longest range out of the three ranges, in other words, image information read during a period from the time T601 to the time T602 in FIG. 7. In addition, the second diagnostic processing is performed based on image information read during a period from the time T621 to the time T623 in FIG. 8, and the third diagnostic processing is performed based on image information of all of the ranges of the sheet P. Note that, when the first diagnostic processing and the second diagnostic processing are performed, and the print job is a job for forming an image only on the first side of a sheet P, image formation on the second side is not performed in accordance with the print job. Accordingly, in this case, the sheet P is conveyed through the circulatory conveyance path in order to read the image on the first side of the sheet P, but the sheet P simply passes through the image formation position after being conveyed through the circulatory conveyance path. On the other hand, when the third diagnostic processing is executed by the diagnosis unit 160, the CPU 104 forms a diagnostic image on each first side of at least one sheet P, and causes the reading unit 110 to read the image on the first side of each sheet P. The diagnosis unit 160 then determines whether or not an image failure has occurred based on the reading result of the first side of the at least one sheet P.

Figure 12:
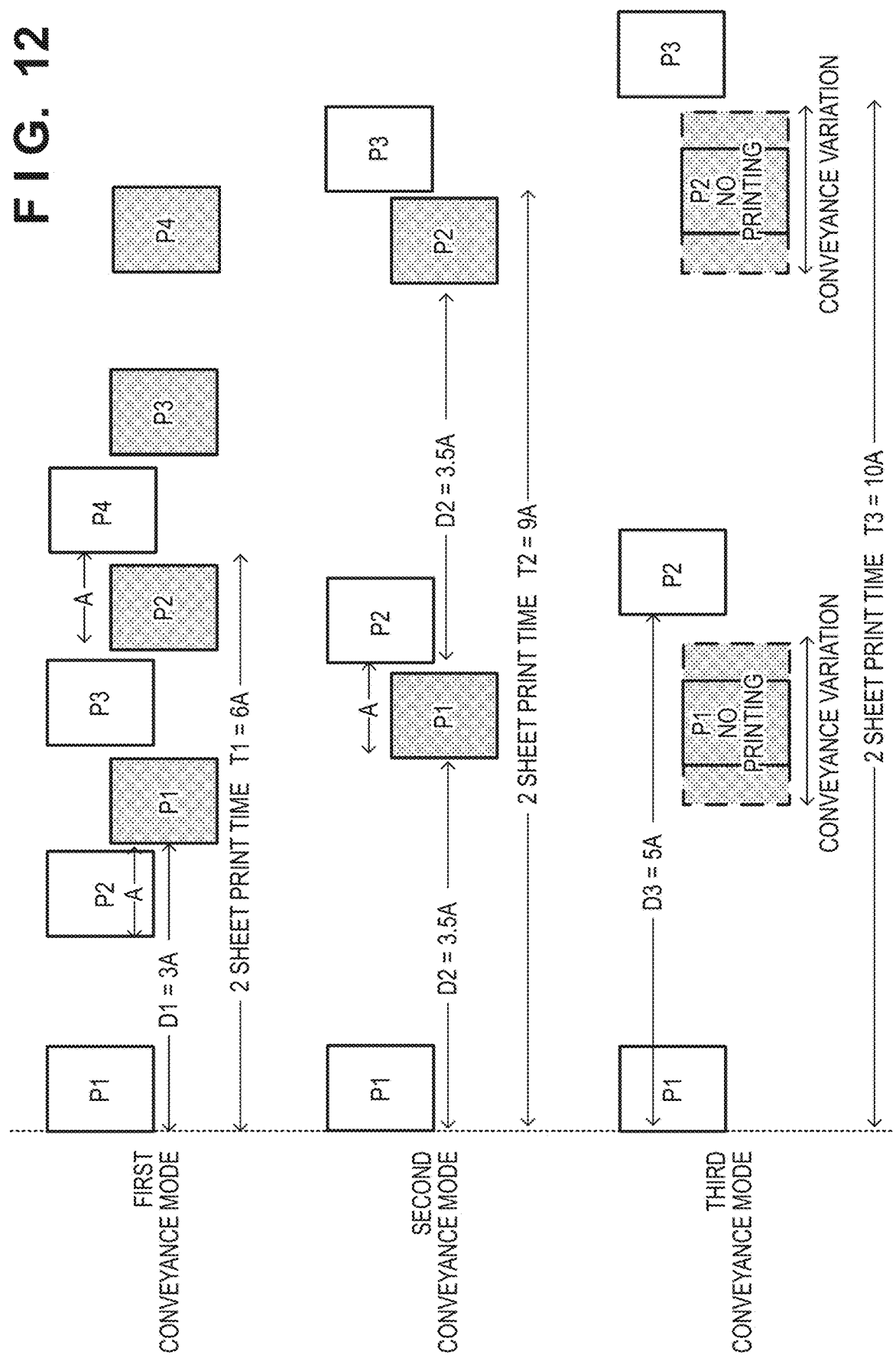
FIG. 12 is a diagram illustrating productivities obtained in the respective conveyance modes.

FIG. 12 is a diagram illustrating the difference in productivity between the conveyance modes. Note that, in FIG. 12, the blank side of each sheet P is a first side, and the shaded side is a second side. First, a basic interval is defined as A. The basic interval A is an interval at which an image is formed on the first side of a sheet P2 and an image is formed on the second side of a sheet P1, in the first conveyance mode. In the first conveyance mode and the second conveyance mode, an image formation interval refers to a time from when an image is transferred onto the first side of a sheet P until when an image is transferred onto the second side of that sheet P, at the image formation position. As shown in FIG. 12, the image formation interval D1 in the first conveyance mode is 3A. Therefore, in the first conveyance mode, a time T1 required for performing printing onto the two sheets P1 and P2 is 6A. On the other hand, in the second conveyance mode, after an image has been formed on the first side of the sheet P1, an image is formed on the second side of the sheet P1. Unlike the first conveyance mode, conveyance is not performed at the increased speed, and thus the image formation interval D2 in the second conveyance mode is 3.5A, longer than that in the image formation interval D1. Therefore, in the second conveyance mode, a time T2 required for performing printing onto the two sheets P1 and P2 is 9A. Note that, in the third conveyance mode, image formation is not performed on the second side of the sheet P, and thus the image formation interval in the third conveyance mode is defined as an image formation interval of two subsequent sheets. Control processing in the third conveyance mode is substantially the same as that in the second conveyance mode, and thus a timing when the sheet P1 reaches the image formation position again after being conveyed through the circulatory conveyance path is about D2. However, in the third conveyance mode, acceleration/deceleration control of the feeding motor 61 for adjusting the timing when the sheet P reaches the image formation position is not performed, and thus the reaching timing can vary. By taking this variation into consideration, the image formation interval D3 in the third conveyance mode is 5A. Therefore, a time T3 required for performing printing on the two sheets P1 and P2 is 10A as shown in FIG. 12. Note that the time T3 in the third conveyance mode is defined as a timing when the second side of the sheet P2 reaches the image formation position, for comparison with the first conveyance mode and the second conveyance mode.

As described above, the first conveyance mode is a conveyance mode that results in the highest productivity, but a period during which the reading unit 110 can read a sheet P in a stable manner is the shortest. For example, in the first conveyance mode, the reading unit 110 can read a sheet P in a stable manner during a period from the timing when the leading edge of the sheet P1 reaches the reading region of the reading unit 11 until when the rotation speed of the double-sided conveyance motor 60 is started to decrease from the increased rotation speed to the reference rotation speed. However, in the first diagnostic processing, even if the period during which the reading unit 110 can perform stable reading is short, image diagnostic processing is not affected. Therefore, when the first diagnostic processing is executed, image diagnostic processing can be accurately performed while maintaining the productivity, by conveying sheets P in the first conveyance mode. On the other hand, in the second conveyance mode, until the double-sided conveyance motor 60 is started to stop, the reading unit 110 can read sheets P in a stable manner. However, a period from when the leading edge of the sheet P reaches the reading region of the reading unit 110 until when the conveyance speed of the sheet P is changed is usually sufficient for detecting cyclic unevenness. Therefore, when the second diagnostic processing is executed, image diagnostic processing can be performed accurately by conveying sheets P in the second conveyance mode, although the productivity decreases slightly compared with the productivity in the first conveyance mode. On the other hand, in the third conveyance mode, the reading unit 110 can read the sheet P over the entire range in the conveyance direction in a stable manner. Therefore, when the third diagnostic processing is executed, various image failures can be accurately detected by conveying the sheet P in the third conveyance mode.

Note that image reading that is performed by the reading unit 110 is not limited to that for image diagnosis. For example, the present invention can be applied when reading an image for the purpose of leaving evidence of a print content. In this case, a conveyance mode is selected according to the range of a sheet P in the vertical direction (conveyance direction) required for leaving the necessary evidence.

In this embodiment, the first diagnostic processing and the second diagnostic processing are executed in a first print job inputted by the user after the execution conditions have been satisfied. However, a configuration can also be adopted in which, if the execution condition is satisfied while a print job for performing printing on a plurality of sheets P is being executed, the diagnostic processing is performed in that print job. In this case, the sheets P after the execution condition has been satisfied are conveyed in the first conveyance mode or the second conveyance mode. In addition, in this embodiment, when the third diagnostic processing is executed, the host computer 103 forms a print job for forming a diagnostic image, and immediately forms a diagnostic image. However, a configuration can also be adopted in which, if a print job inputted by the user is a job for forming an image only on the first side of sheets P, a diagnostic image is formed in that print job, similarly to the first diagnostic processing and the second diagnostic processing. Note that, in this case, a sheet P onto which the diagnostic image has been printed and the sheets P on which printing has been performed based on that print job are discharged to different locations such that they are not mixed up.

Second Embodiment

Next, a second embodiment will be described with a focus on differences from the first embodiment. In the first embodiment, when the first diagnostic processing is executed, the first conveyance mode is used. In this embodiment, the diagnosis unit 160 records/stores results of diagnostic processing carried out in the past, as diagnosis history information. When the first diagnostic processing is executed, the most recent diagnosis result of the first diagnostic processing, in other words, the presence or absence of an image failure is notified to the conveyance control unit 150. If the conveyance control unit 150 receives a print job in a state where execution of the first diagnostic processing has been notified, sheets P are conveyed in the first conveyance mode, but the last sheet of that print job is conveyed in the second conveyance mode, so as to increase the range of the sheets P that can be read in a stable manner.

Figure 13:
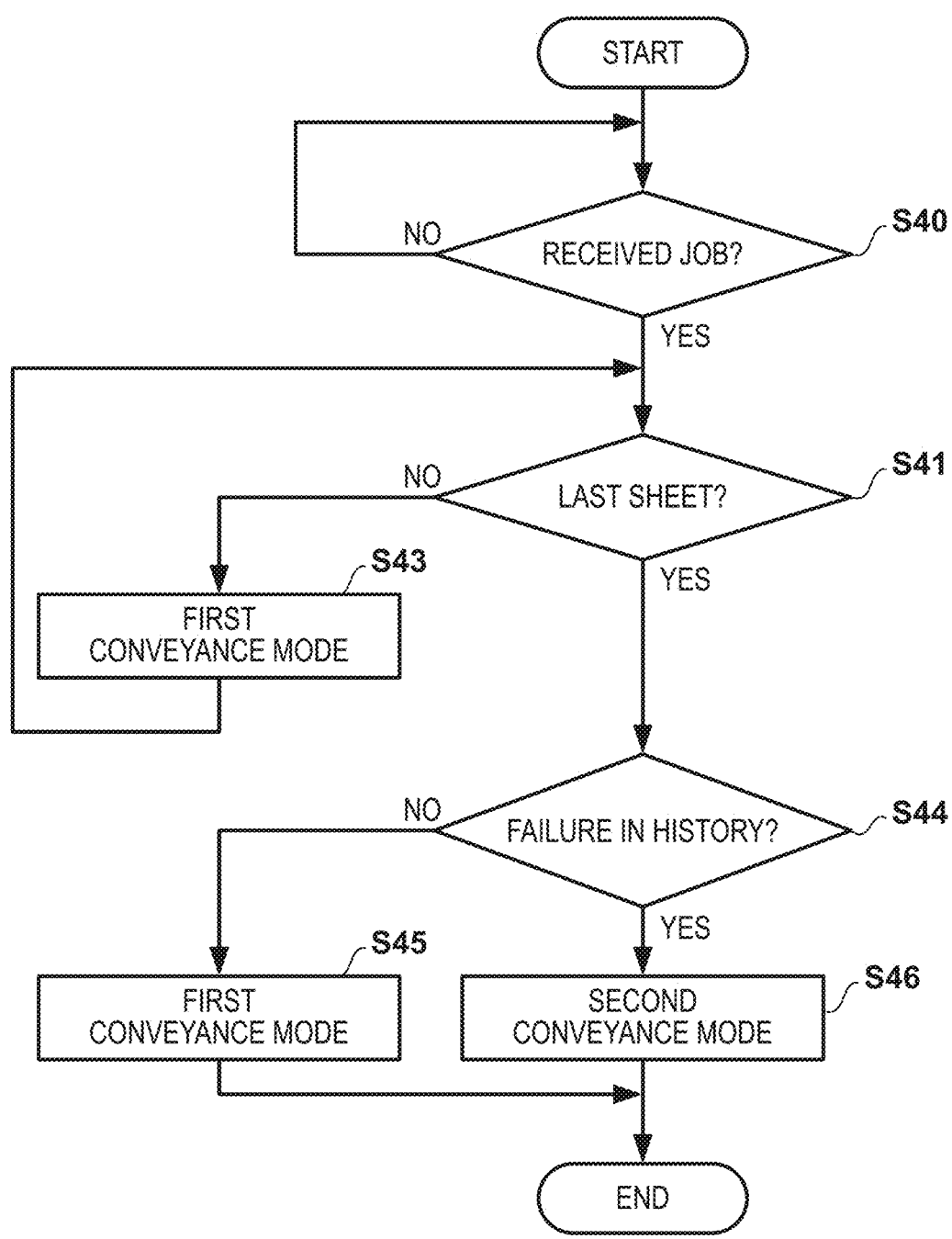
FIG. 13 is a flowchart of conveyance processing that is executed by the conveyance control unit when first diagnostic processing is performed according to an embodiment.

FIG. 13 is a flowchart of conveyance control that is performed by the conveyance control unit 150 when the first diagnostic processing is executed, in this embodiment. In step S40, the conveyance control unit 150 waits until a print job is received. Upon receiving a print job, the conveyance control unit 150 determines, in step S41, whether or not the sheet that is to be fed is the last sheet P of that print job. If it is not the last sheet P, the conveyance control unit 150 uses the first conveyance mode in step S43. Accordingly, the image formation interval is D1. On the other hand, if it is the last sheet P, the conveyance control unit 150 determines, in step S44, whether or not the most recent history received from the diagnosis unit 160 indicates occurrence of an image failure. If the most recent history does not indicate occurrence of an image failure, the conveyance control unit 150 also conveys the last sheet P in the first conveyance mode in step S45. Accordingly, the image formation interval is D1. On the other hand, if the most recent history indicates occurrence of an image failure, the conveyance control unit 150 conveys the last sheet P in the second conveyance mode in step S46. Accordingly, the image formation interval is D2.

Figure 14A:
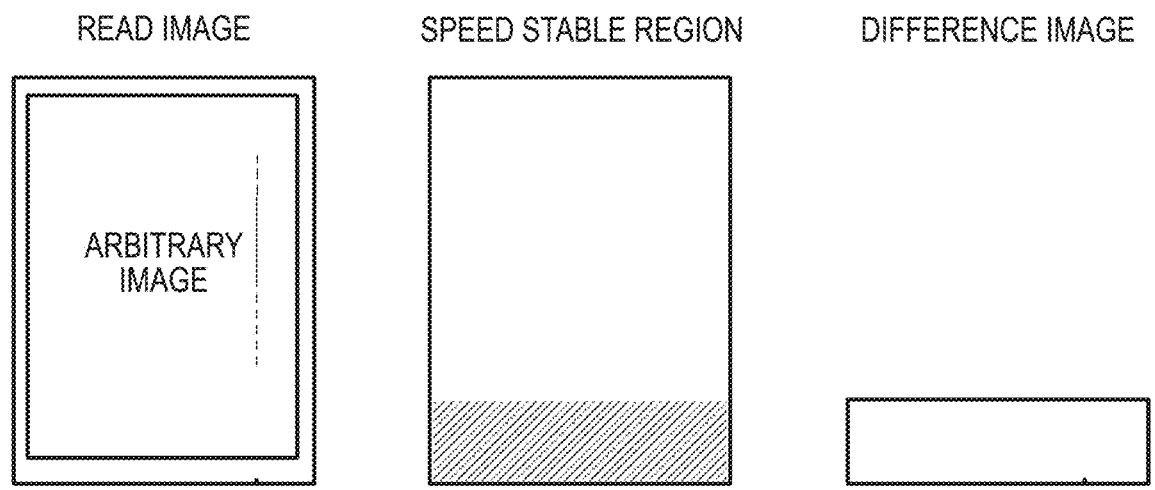
FIGS. 14A and 14B are diagrams illustrating the processing in FIG. 13.
Figure 14B:
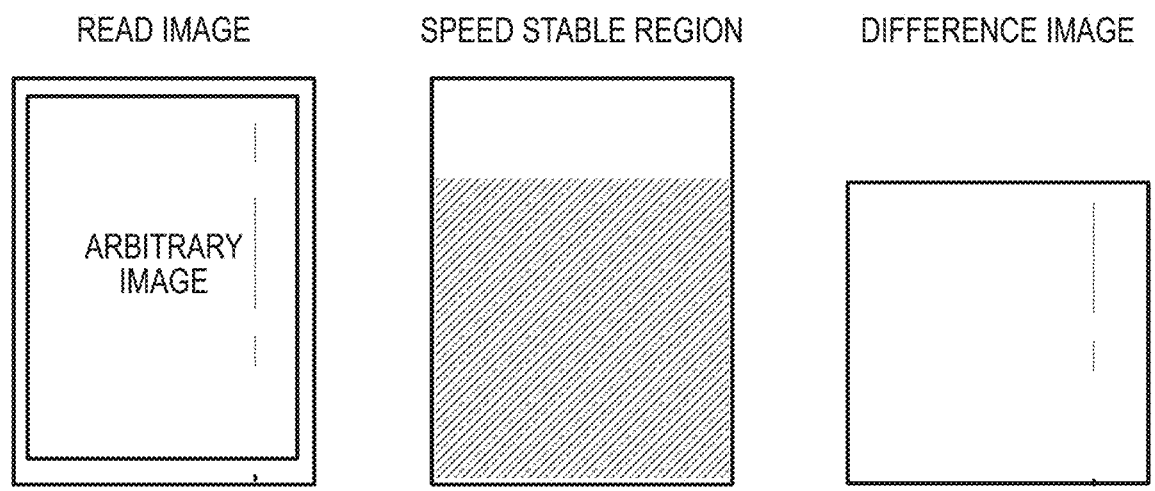

The read images in FIGS. 14A and 14B indicate a state where minute vertical lines have been generated. In addition, a shaded region of a stable speed range in each of FIGS. 14A and 14B indicates a range of a sheet P that is used by the diagnosis unit 160 for performing diagnosis in the first conveyance mode and the second conveyance mode. The shaded region corresponds to a portion in which the reading unit 110 can read the sheet P in a stable manner. Note that the lower side of each of the figures is the leading edge side in the conveyance direction. The difference images in FIGS. 14A and 14B are each shown as a portion of a difference image that is used for diagnosis, the difference image representing the difference between the read image and the original image. In the first conveyance mode, since the range in which the reading unit 110 can perform stable reading is short, there are no vertical lines in a portion that is used for diagnosis in the case of minute vertical lines as shown in FIG. 14A, and thus there may be cases where an image failure cannot be detected. In such cases, the detection accuracy of an image failure can be increased by extending the range in which a sheet is conveyed in the second conveyance mode and can be read by the reading unit 110 in a stable manner. Therefore, in this embodiment, if the diagnosis history information includes a history of vertical lines having been detected, vertical lines are detected accurately by selecting the second conveyance mode.

FIG. 15 is a diagram illustrating the difference in productivity when images are formed on three sheets P when the first diagnostic processing is performed. When only the first conveyance mode is used similarly to the first embodiment, a time from when the first side of the first sheet P1 reaches the image formation position until the timing when the second side of the last sheet P3 reaches the image formation position is 7A. On the other hand, if the sheet P1 and the sheet P2 are conveyed in the first conveyance mode, and the sheet P3 is conveyed in the second conveyance mode, the timing when the second side of the last sheet P3 reaches the image formation position arrives is 7.5A. That is to say, the timing delays by 0.5A compared with a case where only the first conveyance mode is used. On the other hand, if the sheet P1 is conveyed in the first conveyance mode, and the sheets P2 and P3 are conveyed in the second conveyance mode, the timing when the second side of the last sheet P3 reaches the image formation position arrives is 9.5A. That is to say, the timing delays by 2.5A compared with a case where only the first conveyance mode is used.

As described above, in this embodiment, when the first diagnostic processing is performed, the productivity is usually increased by conveying sheets P in the first conveyance mode. However, if an image failure detected in the first diagnostic processing was detected in the past, the last sheet of a print job is conveyed in the second conveyance mode. With this configuration, when an image failure tends to occur, the detection accuracy is improved, and decrease in the productivity is suppressed.

Note that, in this embodiment, if an image failure has been detected in the most recent history out of the histories of the first diagnostic processing, the last sheet in a print job is conveyed in the second conveyance mode. However, a configuration can also be adopted in which, if an image failure was detected in a predetermined number of latest histories, the last sheet in a print job is conveyed in the second conveyance mode. In addition, a configuration can also be adopted in which, even if no image failure is detected in the most recent history, if an image failure is detected in one of the sheets P except for the last sheet while printing is performed based on a print job and the first diagnostic processing is performed, the last sheet is conveyed in the second conveyance mode.

Furthermore, a configuration can also be adopted in which it is possible to instruct, through a user's operation, the image forming apparatus to execute the first diagnostic processing. In this case, similarly to the first embodiment, in the first diagnostic processing that is dynamically executed by the image forming apparatus if the execution condition is satisfied, the first conveyance mode is used. On the other hand, a configuration can also be adopted in which, if the user inputs an instruction to execute the first diagnostic processing, the last sheet of a print job is conveyed in the second conveyance mode in order to increase the detection accuracy. Furthermore, a configuration can also be adopted in which, when the user inputs an instruction to execute the first diagnostic processing, all of the sheets of a print job or a predetermined number of last sheets are conveyed in the second conveyance mode in order to increase the detection accuracy. This is because the user's inputting an instruction to execute the first diagnostic processing indicates that it is highly likely that no image failure could be detected in the first diagnostic processing dynamically executed by the image forming apparatus when the execution condition is satisfied; however the user recognized an image failure.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-134018, filed on Jul. 19, 2019, which is hereby incorporated by reference herein in its entirety.

What is claimed is:
1. An image forming apparatus comprising:
 an image formation unit configured to form an image on a sheet at a formation position;
 a circulatory conveyance path for conveying the sheet with the image formed at the formation position on a first side thereof to the formation position again;
 a reading unit configured to read the first side of the sheet conveyed through the circulatory conveyance path, and output image information on the first side of the sheet; and
 a conveyance control unit configured to convey the sheet in one conveyance mode out of a plurality of conveyance modes when the reading unit reads the first side of the sheet, wherein a range, in a conveyance direction, of the sheet that can be read by the reading unit while a conveyance speed of the sheet is constant is different for each of the plurality of conveyance modes.

2. The image forming apparatus according to claim 1, further comprising:
a processing unit configured to process the image information on the first side,
wherein the conveyance control unit is further configured to select one of the conveyance modes for conveying the sheet, according to a range, in the conveyance direction, of the first side of the sheet that the reading unit needs to read for the processing unit to perform the processing.

3. The image forming apparatus according to claim 2, wherein the plurality of conveyance modes include a first conveyance mode in which a conveyance speed of the sheet is constant while the reading unit is reading a first range of the first side in the conveyance direction, a second conveyance mode in which the conveyance speed of the sheet is constant while the reading unit is reading a second range that is longer than the first range of the first side, and a third conveyance mode in which the conveyance speed of the sheet is constant while the reading unit is reading a third range that is longer than the second range of the first side.

4. The image forming apparatus according to claim 3, wherein the third range is an entire range of the first side in the conveyance direction.

5. The image forming apparatus according to claim 3, wherein the processing unit is a diagnosis unit configured to diagnose whether or not an image failure has occurred on the sheet based on the image information of the first side.

6. The image forming apparatus according to claim 5, wherein diagnostic processing that is executed by the diagnosis unit includes first diagnostic processing that is performed using the image information of at least the first range of the first side, and
the conveyance control unit is further configured to select the first conveyance mode when the diagnosis unit executes the first diagnostic processing.

7. The image forming apparatus according to claim 6, wherein the first diagnostic processing is processing for determining whether or not an image of lines or streaks in the conveyance direction has been generated on the sheet.

8. The image forming apparatus according to claim 5, wherein diagnostic processing that is executed by the diagnosis unit includes first diagnostic processing that is performed using the image information of at least the first range of the first side,
the conveyance control unit is further configured to select the second conveyance mode when the diagnosis unit executes the first diagnostic processing according to a user's instruction,
the conveyance control unit is further configured to select the first conveyance mode when the diagnosis unit executes the first diagnostic processing independently from a user's instruction, and
the diagnosis unit is further configured to execute the first diagnostic processing using the image information of the second range of the first side when the conveyance control unit selects the second conveyance mode.

9. The image forming apparatus according to claim 5, wherein diagnostic processing that is executed by the diagnosis unit includes first diagnostic processing that is performed using the image information of at least the first range of the first side,
the diagnosis unit is further configured to execute the first diagnostic processing based on the image information of the first side read by the reading unit while the image formation unit is forming the image on a plurality of sheets in accordance with a print job input by a user, and to store, as a diagnosis history, a diagnosis result of the first diagnostic processing indicating whether or not the image failure has occurred, and
the conveyance control unit is further configured to select the first conveyance mode for all of the sheets of the print job when the first diagnostic processing is executed in the print job and the diagnosis history does not indicate occurrence of the image failure.

10. The image forming apparatus according to claim 9, wherein the conveyance control unit is further configured to, if the diagnosis history indicates occurrence of the image failure, select the second conveyance mode for a last sheet in the print job, and select the first conveyance mode for other sheets, and
the diagnosis unit is further configured to execute the first diagnostic processing using the image information of the second range of the first side for the sheet for which the conveyance control unit selected the second conveyance mode.

11. The image forming apparatus according to claim 10, wherein the conveyance control unit is further configured to, if most recent history in the diagnosis history indicates occurrence of the image failure, select the second conveyance mode for the last sheet in the print job, and select the first conveyance mode for the other sheets.

12. The image forming apparatus according to claim 5, wherein diagnostic processing that is executed by the diagnosis unit includes first diagnostic processing that is performed using the image information of at least the first range of the first side,
the diagnosis unit is further configured to execute the first diagnostic processing based on the image information of the first side read by the reading unit while the image formation unit is forming the image on a plurality of sheets in accordance with a print job input by a user,
the conveyance control unit is further configured to, when the first diagnostic processing is executed in the print job, select the first conveyance mode and, if the diagnosis unit detects an image failure on the sheet conveyed in the first conveyance mode, select the second conveyance mode for a last sheet in the print job, and
the diagnosis unit is further configured to perform the first diagnostic processing using the image information of the second range of the first side for the sheet for which the conveyance control unit selected the second conveyance mode.

13. The image forming apparatus according to claim 5, wherein diagnostic processing that is executed by the diagnosis unit includes first diagnostic processing that is performed using the image information of at least the first range of the first side,
the diagnosis unit is further configured to execute the first diagnostic processing based on the image information of the first side read by the reading unit while the image formation unit is forming the image on a plurality of sheets in accordance with a print job input by a user, the conveyance control unit is further configured to, when the first diagnostic processing is executed in the print job according to a user's instruction, select the second conveyance mode for a last sheet in the print job, and select the first conveyance mode for other sheets, and the diagnosis unit is further configured to execute the first diagnostic processing using the image information of the second range of the first side for the sheet for which the conveyance control unit selected the second conveyance mode.

14. The image forming apparatus according to claim 5, wherein diagnostic processing that is executed by the diagnosis unit further includes second diagnostic processing that is performed using the image information of at least the second range of the first side, and third diagnostic processing that is performed using the image information of the third range of the first side, the conveyance control unit is further configured to select the second conveyance mode when the diagnosis unit executes the second diagnostic processing, and the conveyance control unit is further configured to select the third conveyance mode when the diagnosis unit executes the third diagnostic processing.

15. The image forming apparatus according to claim 14, wherein the second diagnostic processing is processing for determining whether or not cyclic density change has occurred on the sheet in the conveyance direction.

16. The image forming apparatus according to claim 14, wherein the third diagnostic processing is processing for forming a diagnostic image on the sheet, and for determining whether or not an image failure has occurred.

17. The image forming apparatus according to claim 5, wherein the first conveyance mode is a conveyance mode in which, in a period from when an image is formed on the first side of a first sheet until when the first sheet is conveyed to the formation position again, an image is formed on the first side of a second sheet that follows the first sheet.

18. The image forming apparatus according to claim 5, wherein the second conveyance mode and the third conveyance mode are conveyance modes in which, after an image is formed on the first side of a first sheet and the first sheet is conveyed to the formation position again, an image is formed on the first side of a second sheet that follows the first sheet.

19. The image forming apparatus according to claim 5, wherein the first conveyance mode and the second conveyance mode are conveyance modes in which an image can be formed on both the first side of the sheet and a second side that is opposite to the first side.

20. The image forming apparatus according to claim 5, wherein the third conveyance mode is a conveyance mode in which an image can be formed only on the first side of the sheet.

21. The image forming apparatus according to claim 1, wherein the plurality of conveyance modes include a first conveyance mode and a second conveyance mode, wherein the first conveyance mode is a conveyance mode in which, in a period from when an image is formed on the first side of a first sheet until when the first sheet is conveyed to the formation position again, an image is formed on the first side of a second sheet that follows the first sheet, and wherein the second conveyance mode is a conveyance mode in which, after an image is formed on the first side of a first sheet and the first sheet is conveyed to the formation position again, an image is formed on the first side of a second sheet that follows the first sheet.

22. The image forming apparatus according to claim 1, wherein the plurality of conveyance modes include a first conveyance mode and a second conveyance mode, wherein the first conveyance mode is a conveyance mode in which an image can be formed on both the first side of the sheet and a second side that is opposite to the first side, and wherein the second conveyance mode is a conveyance mode in which an image can be formed only on the first side of the sheet.

23. An image forming apparatus comprising:
an image formation unit configured to form an image on a sheet at a formation position;
a circulatory conveyance path for conveying the sheet with the image formed at the formation position on a first side thereof to the formation position again;
a reading unit configured to read the first side of the sheet conveyed through the circulatory conveyance path, and output image information on the first side of the sheet;
a diagnosis unit configured to diagnose whether or not an image failure has occurred on the sheet based on the image information output from the reading unit; and
a conveyance control unit configured to convey the sheet in one conveyance mode out of a plurality of conveyance modes when conveying the sheet on the circulatory conveyance path, wherein the conveyance control unit is further configured to select the conveyance mode depending on a first diagnostic processing or a second diagnostic processing, the first diagnostic processing being for diagnosing a first type of the image failure and the second diagnostic processing being for diagnosing a second type of the image failure.

24. The image forming apparatus according to claim 23, wherein the conveyance control unit is further configured to select a first conveyance mode in accordance with the first diagnostic processing and select a second conveyance mode in accordance with the second diagnostic processing, wherein the first conveyance mode is a conveyance mode in which, in a period from when an image is formed on the first side of a first sheet until when the first sheet is conveyed to the formation position again, an image is formed on the first side of a second sheet that follows the first sheet, and wherein the second conveyance mode is a conveyance mode in which, after an image is formed on the first side of a first sheet and the first sheet is conveyed to the formation position again, an image is formed on the first side of a second sheet that follows the first sheet.

25. The image forming apparatus according to claim 23, wherein the conveyance control unit is further configured to select a first conveyance mode in accordance with the first diagnostic processing and select a second conveyance mode in accordance with the second diagnostic processing, wherein the first conveyance mode is a conveyance mode in which an image can be formed on both the first side of the sheet and a second side that is opposite to the first side, and wherein the second conveyance mode is a conveyance mode in which an image can be formed only on the first side of the sheet.

26. The image forming apparatus according to claim 23,
wherein the first diagnostic processing is performed every time an image is formed on a predetermined number of sheets, and
wherein the second diagnostic processing is performed when a user inputs an instruction to perform diagnosis of image failure.

27. The image forming apparatus according to claim 23,
wherein the first diagnostic processing is a processing that is performed while the image forming unit forms an image on the sheet based on a job instructed by a user, and
wherein the second diagnostic processing is a processing that is performed by forming a diagnostic image, which is not based on the job instructed by the user, on the sheet by the image forming unit.

28. The image forming apparatus according to claim 23,
wherein the first type of the image failure is an image of lines or streaks in a conveyance direction, and
wherein the second type of the image failure includes at least both an image of lines or streaks in the conveyance direction and cyclic density change in the conveyance direction.

* * * * *